United States Patent
Chang et al.

(10) Patent No.: US 9,342,783 B1
(45) Date of Patent: May 17, 2016

(54) SYSTEMS AND METHODS FOR DATA VERIFICATION

(75) Inventors: Albert Chia-Shu Chang, Lake Forest, CA (US); Gregory Dean Jones, Irvine, CA (US); Carolyn Paige Soltes Matthies, Ladera Ranch, CA (US)

(73) Assignee: Consumerinfo.com, Inc., Irvine, CA (US)

( * ) Notice: Subject to any disclaimer, the term of this patent is extended or adjusted under 35 U.S.C. 154(b) by 831 days.

(21) Appl. No.: 13/620,103

(22) Filed: Sep. 14, 2012

Related U.S. Application Data

(63) Continuation of application No. 12/058,632, filed on Mar. 28, 2008, now Pat. No. 8,285,656.

(60) Provisional application No. 60/921,188, filed on Mar. 30, 2007.

(51) Int. Cl.
*G06N 5/02* (2006.01)

(52) U.S. Cl.
CPC . *G06N 5/02* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 4,163,290 | A | 7/1979 | Sutherlin et al. |
| 4,346,442 | A | 8/1982 | Musmanno |
| 4,827,508 | A | 5/1989 | Shear |
| 4,868,570 | A | 9/1989 | Davis |
| 4,935,870 | A | 6/1990 | Burk, Jr. et al. |
| 4,989,141 | A | 1/1991 | Lyons et al. |
| 5,216,612 | A | 6/1993 | Cornett et al. |
| 5,247,575 | A | 9/1993 | Sprague et al. |
| 5,325,509 | A | 6/1994 | Lautzenheiser |
| 5,341,429 | A | 8/1994 | Stringer et al. |

(Continued)

FOREIGN PATENT DOCUMENTS

| | | |
|---|---|---|
| EP | 0 419 889 | 4/1991 |
| EP | 0 458 698 | 11/1991 |

(Continued)

OTHER PUBLICATIONS

Chiba, et al., Mobility Management Schemes for Heterogeneity Support in Next Generation Wireless Networks, Next Generation Internet Networks, 3rd EuroNGI Conference on, 2007, pp. 143-150.*

(Continued)

*Primary Examiner* — Wilbert L Starks
(74) *Attorney, Agent, or Firm* — Knobbe, Martens, Olson & Bear, LLP

(57) ABSTRACT

Embodiments are directed to data verification of business or consumer data. Certain embodiments include a data verification system that receives or selects data to be verified, selects one or more verification methods to verify, update, and/or append/enhance the data. The data verification system may verify the data with one or more data verification methods, either alone or in combination. The methods may include a web-crawling verification method, an agent web verification method, a call verification method, a direct mail method, an email method, an in-person verification method, or other methods. The system has the ability to, automatically or manually, (1) blend automatic and manual segmentation of records or elements by criteria such as industry type, best times of day/month/year to verify, update, or append, cost, and level of importance (2) select the best verification processing method(s), and (3) manage the results and properly verify, update, append/enhance records.

9 Claims, 8 Drawing Sheets

(56) References Cited

U.S. PATENT DOCUMENTS

| | | |
|---|---|---|
| 5,528,701 A | 6/1996 | Aref |
| 5,555,409 A | 9/1996 | Leenstra, Sr. et al. |
| 5,590,038 A | 12/1996 | Pitroda |
| 5,621,201 A | 4/1997 | Langhans et al. |
| 5,628,004 A | 5/1997 | Gormley et al. |
| 5,629,982 A | 5/1997 | Micali |
| 5,630,070 A | 5/1997 | Dietrich et al. |
| 5,640,551 A | 6/1997 | Chu et al. |
| 5,640,577 A | 6/1997 | Scharmer |
| 5,655,129 A | 8/1997 | Ito |
| 5,659,731 A | 8/1997 | Gustafson |
| 5,666,528 A | 9/1997 | Thai |
| 5,692,107 A | 11/1997 | Simoudis et al. |
| 5,737,732 A | 4/1998 | Gibson et al. |
| 5,739,512 A | 4/1998 | Tognazzini |
| 5,748,098 A | 5/1998 | Grace |
| 5,754,632 A | 5/1998 | Smith |
| 5,754,939 A | 5/1998 | Herz et al. |
| 5,765,143 A | 6/1998 | Sheldon et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |
| 5,812,840 A | 9/1998 | Shwartz |
| 5,819,291 A | 10/1998 | Haimowitz et al. |
| 5,822,750 A | 10/1998 | Jou et al. |
| 5,822,751 A | 10/1998 | Gray et al. |
| 5,825,884 A | 10/1998 | Zdepski et al. |
| 5,828,837 A | 10/1998 | Eikeland |
| 5,832,068 A | 11/1998 | Smith |
| 5,835,915 A | 11/1998 | Carr et al. |
| 5,844,218 A | 12/1998 | Kawan et al. |
| 5,881,131 A | 3/1999 | Farris et al. |
| 5,893,090 A | 4/1999 | Friedman et al. |
| 5,905,985 A | 5/1999 | Malloy et al. |
| 5,930,764 A | 7/1999 | Melchione et al. |
| 5,956,693 A | 9/1999 | Geerlings |
| 5,960,430 A | 9/1999 | Haimowitz et al. |
| 5,961,593 A | 10/1999 | Gabber et al. |
| 5,963,932 A | 10/1999 | Jakobsson et al. |
| 5,966,695 A | 10/1999 | Melchione et al. |
| 6,014,688 A | 1/2000 | Venkatraman et al. |
| 6,038,551 A | 3/2000 | Barlow et al. |
| 6,070,147 A | 5/2000 | Harms et al. |
| 6,070,241 A | 5/2000 | Edwards et al. |
| 6,072,894 A | 6/2000 | Payne |
| 6,073,106 A | 6/2000 | Rozen et al. |
| 6,073,140 A | 6/2000 | Morgan et al. |
| 6,078,892 A | 6/2000 | Anderson et al. |
| 6,085,242 A | 7/2000 | Chandra |
| 6,119,103 A | 9/2000 | Basch et al. |
| 6,121,901 A | 9/2000 | Welch et al. |
| 6,128,602 A | 10/2000 | Northington et al. |
| 6,128,624 A | 10/2000 | Papierniak et al. |
| 6,144,957 A | 11/2000 | Cohen et al. |
| 6,151,601 A | 11/2000 | Papierniak et al. |
| 6,157,707 A | 12/2000 | Baulier et al. |
| 6,157,927 A | 12/2000 | Schaefer et al. |
| 6,161,139 A | 12/2000 | Win et al. |
| 6,178,442 B1 | 1/2001 | Yamazaki |
| 6,202,053 B1 | 3/2001 | Christiansen et al. |
| 6,223,171 B1 | 4/2001 | Chaudhuri et al. |
| 6,253,202 B1 | 6/2001 | Gilmour |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,275,824 B1 | 8/2001 | O'Flaherty et al. |
| 6,304,869 B1 | 10/2001 | Moore et al. |
| 6,311,169 B2 | 10/2001 | Duhon |
| 6,321,205 B1 | 11/2001 | Eder |
| 6,339,769 B1 | 1/2002 | Cochrane et al. |
| 6,366,903 B1 | 4/2002 | Agrawal et al. |
| 6,393,406 B1 | 5/2002 | Eder |
| 6,397,197 B1 | 5/2002 | Gindlesperger |
| 6,405,173 B1 | 6/2002 | Honarvar et al. |
| 6,424,878 B1 | 7/2002 | Barker et al. |
| 6,446,200 B1 | 9/2002 | Ball et al. |
| 6,448,980 B1 | 9/2002 | Kumar et al. |
| 6,453,353 B1 | 9/2002 | Win et al. |
| 6,457,012 B1 | 9/2002 | Jatkowski |
| 6,463,533 B1 | 10/2002 | Calamera et al. |
| 6,496,819 B1 | 12/2002 | Bello et al. |
| 6,496,827 B2 | 12/2002 | Kozam et al. |
| 6,496,931 B1 | 12/2002 | Rajchel et al. |
| 6,505,168 B1 | 1/2003 | Rothman et al. |
| 6,523,021 B1 | 2/2003 | Monberg et al. |
| 6,523,022 B1 | 2/2003 | Hobbs |
| 6,523,041 B1 | 2/2003 | Morgan et al. |
| 6,543,683 B2 | 4/2003 | Hoffman |
| 6,564,210 B1 | 5/2003 | Korda et al. |
| 6,574,623 B1 | 6/2003 | Laung et al. |
| 6,574,736 B1 | 6/2003 | Andrews |
| 6,581,059 B1 | 6/2003 | Barrett et al. |
| 6,601,173 B1 | 7/2003 | Mohler |
| 6,601,234 B1 | 7/2003 | Bowman-Amuah |
| 6,647,383 B1 | 11/2003 | August et al. |
| 6,651,220 B1 | 11/2003 | Penteroudakis et al. |
| 6,658,393 B1 | 12/2003 | Basch et al. |
| 6,708,166 B1 | 3/2004 | Dysart et al. |
| 6,714,944 B1 | 3/2004 | Shapiro et al. |
| 6,725,381 B1 | 4/2004 | Smith et al. |
| 6,738,748 B2 | 5/2004 | Wetzer |
| 6,748,426 B1 | 6/2004 | Shaffer et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,782,379 B2 | 8/2004 | Lee |
| 6,804,346 B1 | 10/2004 | Mewhinney |
| 6,804,701 B2 | 10/2004 | Muret et al. |
| 6,816,871 B2 | 11/2004 | Lee |
| 6,845,448 B1 | 1/2005 | Chaganti et al. |
| 6,850,895 B2 | 2/2005 | Brodersen et al. |
| 6,868,389 B1 | 3/2005 | Wilkins et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,947,989 B2 | 9/2005 | Gullotta et al. |
| 6,950,858 B2 | 9/2005 | Ogami |
| 6,954,757 B2 | 10/2005 | Zargham et al. |
| 6,976,056 B1 | 12/2005 | Kumar |
| 6,983,379 B1 | 1/2006 | Spalink et al. |
| 6,983,478 B1 | 1/2006 | Grauch et al. |
| 6,985,887 B1 | 1/2006 | Sunstein et al. |
| 6,999,941 B1 | 2/2006 | Agarwal |
| 7,003,504 B1 | 2/2006 | Angus et al. |
| 7,006,614 B2 | 2/2006 | Feinberg et al. |
| 7,016,907 B2 | 3/2006 | Boreham et al. |
| 7,028,001 B1 | 4/2006 | Muthuswamy et al. |
| 7,028,052 B2 | 4/2006 | Chapman et al. |
| 7,035,699 B1 | 4/2006 | Anderson et al. |
| 7,035,855 B1 | 4/2006 | Kilger et al. |
| 7,039,176 B2 | 5/2006 | Borodow et al. |
| 7,039,607 B2 | 5/2006 | Watarai et al. |
| 7,043,476 B2 | 5/2006 | Robson |
| 7,043,531 B1 | 5/2006 | Seibel et al. |
| 7,047,251 B2 | 5/2006 | Reed et al. |
| 7,050,982 B2 | 5/2006 | Sheinson et al. |
| 7,050,989 B1 | 5/2006 | Hurt et al. |
| 7,062,475 B1 | 6/2006 | Szabo et al. |
| 7,065,566 B2 | 6/2006 | Menard et al. |
| 7,069,240 B2 | 6/2006 | Spero et al. |
| 7,076,475 B2 | 7/2006 | Honarvar |
| 7,082,435 B1 | 7/2006 | Guzman et al. |
| 7,092,898 B1 | 8/2006 | Mattick et al. |
| 7,124,144 B2 | 10/2006 | Christianson et al. |
| 7,133,935 B2 | 11/2006 | Hedy |
| 7,136,448 B1 | 11/2006 | Venkataperumal et al. |
| 7,155,739 B2 | 12/2006 | Bari et al. |
| 7,167,907 B2 | 1/2007 | Shaffer et al. |
| 7,184,974 B2 | 2/2007 | Shishido |
| 7,185,016 B1 | 2/2007 | Rasmussen |
| 7,188,169 B2 | 3/2007 | Buus et al. |
| 7,194,416 B1 | 3/2007 | Provost et al. |

(56) References Cited

U.S. PATENT DOCUMENTS

| | | | |
|---|---|---|---|
| 7,200,602 B2 | 4/2007 | Jonas |
| 7,219,107 B2 | 5/2007 | Beringer |
| 7,222,369 B2 | 5/2007 | Vering et al. |
| 7,228,284 B1 | 6/2007 | Vaillancourt et al. |
| 7,234,160 B2 | 6/2007 | Vogel et al. |
| 7,240,059 B2 | 7/2007 | Bayliss et al. |
| 7,243,369 B2 | 7/2007 | Bhat et al. |
| 7,246,067 B2 | 7/2007 | Austin et al. |
| 7,249,048 B1 | 7/2007 | O'Flaherty |
| 7,251,625 B2 | 7/2007 | Anglum |
| 7,272,591 B1 | 9/2007 | Ghazal et al. |
| 7,277,900 B1 | 10/2007 | Ganesh et al. |
| 7,315,837 B2 | 1/2008 | Sloan et al. |
| 7,328,233 B2 | 2/2008 | Salim et al. |
| 7,333,976 B1 | 2/2008 | Auerbach et al. |
| 7,340,679 B2 | 3/2008 | Botscheck et al. |
| 7,346,703 B2 | 3/2008 | Cope |
| 7,356,516 B2 | 4/2008 | Richey et al. |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,373,335 B2 | 5/2008 | Cleghorn et al. |
| 7,376,603 B1 | 5/2008 | Mayr et al. |
| 7,383,215 B1 | 6/2008 | Navarro et al. |
| 7,383,988 B2 | 6/2008 | Slonecker, Jr. |
| 7,395,273 B2 | 7/2008 | Khan et al. |
| 7,403,942 B1 | 7/2008 | Bayliss |
| 7,421,322 B1 | 9/2008 | Silversmith et al. |
| 7,421,442 B2 | 9/2008 | Gelb et al. |
| 7,424,439 B1 | 9/2008 | Fayyad et al. |
| 7,433,864 B2 | 10/2008 | Malik |
| 7,451,113 B1 | 11/2008 | Kasower |
| 7,460,857 B2 | 12/2008 | Roach, Jr. |
| 7,467,127 B1 | 12/2008 | Baccash et al. |
| 7,467,401 B2 | 12/2008 | Cicchitto |
| 7,475,118 B2 | 1/2009 | Leiba et al. |
| 7,478,157 B2 | 1/2009 | Bohrer et al. |
| 7,483,842 B1 | 1/2009 | Fung et al. |
| 7,505,938 B2 | 3/2009 | Lang et al. |
| 7,529,698 B2 | 5/2009 | Joao |
| 7,533,179 B2 | 5/2009 | Tarquini et al. |
| 7,536,346 B2 | 5/2009 | Aliffi et al. |
| 7,543,739 B2 | 6/2009 | Brown et al. |
| 7,546,266 B2 | 6/2009 | Beirne et al. |
| 7,546,271 B1 | 6/2009 | Chmielewski et al. |
| 7,552,089 B2 | 6/2009 | Bruer et al. |
| 7,556,192 B2 | 7/2009 | Wokaty, Jr. |
| 7,559,217 B2 | 7/2009 | Bass |
| 7,562,093 B2 | 7/2009 | Gelb et al. |
| 7,562,184 B2 | 7/2009 | Henmi et al. |
| 7,562,814 B1 | 7/2009 | Shao et al. |
| 7,571,138 B2 | 8/2009 | Miri et al. |
| 7,571,473 B1 | 8/2009 | Boydstun et al. |
| 7,577,934 B2 | 8/2009 | Anonsen et al. |
| 7,584,146 B1 | 9/2009 | Duhon |
| 7,587,366 B2 | 9/2009 | Grim, III et al. |
| 7,593,889 B2 | 9/2009 | Raines et al. |
| 7,596,512 B1 | 9/2009 | Raines et al. |
| 7,596,716 B2 | 9/2009 | Frost et al. |
| 7,603,701 B2 | 10/2009 | Gaucas |
| 7,606,725 B2 | 10/2009 | Robertson et al. |
| 7,613,600 B2 | 11/2009 | Krane |
| 7,630,989 B2 | 12/2009 | Weir et al. |
| 7,634,737 B2 | 12/2009 | Beringer et al. |
| 7,647,344 B2 | 1/2010 | Skurtovich, Jr. et al. |
| 7,653,592 B1 | 1/2010 | Flaxman et al. |
| 7,653,688 B2 | 1/2010 | Bittner |
| 7,668,725 B2 | 2/2010 | Alston |
| 7,668,840 B2 | 2/2010 | Bayliss et al. |
| 7,672,833 B2 | 3/2010 | Blume et al. |
| 7,672,865 B2 | 3/2010 | Kumar et al. |
| 7,672,924 B1 | 3/2010 | Scheurich et al. |
| 7,672,926 B2 | 3/2010 | Ghazal et al. |
| 7,676,751 B2 | 3/2010 | Allen et al. |
| 7,685,209 B1 | 3/2010 | Norton et al. |
| 7,689,505 B2 | 3/2010 | Kasower |
| 7,698,163 B2 | 4/2010 | Reed et al. |
| 7,698,445 B2 | 4/2010 | Fitzpatrick et al. |
| 7,707,059 B2 | 4/2010 | Reed et al. |
| 7,707,271 B2 | 4/2010 | Rudkin et al. |
| 7,711,635 B2 | 5/2010 | Steele et al. |
| 7,730,078 B2 | 6/2010 | Schwabe et al. |
| 7,739,139 B2 | 6/2010 | Robertson et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,765,166 B2 | 7/2010 | Beringer et al. |
| 7,765,311 B2 | 7/2010 | Itabashi et al. |
| 7,769,696 B2 | 8/2010 | Yoda |
| 7,774,270 B1 | 8/2010 | MacCloskey |
| 7,783,515 B1 | 8/2010 | Kumar et al. |
| 7,788,040 B2 | 8/2010 | Haskell et al. |
| 7,792,715 B1 | 9/2010 | Kasower |
| 7,797,252 B2 | 9/2010 | Rosskamm et al. |
| 7,797,725 B2 | 9/2010 | Lunt et al. |
| 7,801,812 B2 | 9/2010 | Conlin et al. |
| 7,801,956 B1 | 9/2010 | Cumberbatch et al. |
| 7,810,036 B2 | 10/2010 | Bales et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,832,006 B2 | 11/2010 | Chen et al. |
| 7,836,111 B1 | 11/2010 | Shan |
| 7,841,008 B1 | 11/2010 | Cole et al. |
| 7,844,604 B2 | 11/2010 | Baio et al. |
| 7,853,518 B2 | 12/2010 | Cagan |
| 7,877,304 B1 | 1/2011 | Coulter |
| 7,908,242 B1 | 3/2011 | Achanta |
| 7,912,865 B2 | 3/2011 | Akerman et al. |
| 7,930,195 B2 | 4/2011 | Heyns et al. |
| 7,930,242 B2 | 4/2011 | Morris et al. |
| 7,970,679 B2 | 6/2011 | Kasower |
| 7,975,299 B1 | 7/2011 | Balducci et al. |
| 7,983,932 B2 | 7/2011 | Kane |
| 7,991,901 B2 | 8/2011 | Tarquini et al. |
| 7,996,912 B2 | 8/2011 | Spalink et al. |
| 8,001,153 B2 | 8/2011 | Skurtovich, Jr. et al. |
| 8,001,235 B2 | 8/2011 | Russ et al. |
| 8,005,759 B2 | 8/2011 | Hirtenstein et al. |
| 8,024,264 B2 | 9/2011 | Chaudhuri et al. |
| 8,027,871 B2 | 9/2011 | Williams et al. |
| 8,037,097 B2 | 10/2011 | Guo et al. |
| 8,060,424 B2 | 11/2011 | Kasower |
| 8,065,233 B2 | 11/2011 | Lee et al. |
| 8,065,264 B1 | 11/2011 | Achanta |
| 8,078,453 B2 | 12/2011 | Shaw |
| 8,095,458 B2 | 1/2012 | Peterson et al. |
| 8,099,341 B2 | 1/2012 | Varghese |
| 8,104,679 B2 | 1/2012 | Brown |
| 8,127,986 B1 | 3/2012 | Taylor et al. |
| 8,131,777 B2 | 3/2012 | McCullough |
| 8,135,607 B2 | 3/2012 | Williams et al. |
| 8,161,104 B2 | 4/2012 | Tomkow |
| 8,175,889 B1 | 5/2012 | Girulat, Jr. et al. |
| 8,195,549 B2 | 6/2012 | Kasower |
| 8,201,257 B1 | 6/2012 | Andres et al. |
| 8,214,238 B1 | 7/2012 | Fairfield et al. |
| 8,224,723 B2 | 7/2012 | Bosch et al. |
| 8,234,498 B2 | 7/2012 | Britti et al. |
| 8,271,313 B2 | 9/2012 | Williams et al. |
| 8,271,378 B2 | 9/2012 | Chaudhuri et al. |
| 8,280,805 B1 | 10/2012 | Abrahams et al. |
| 8,285,656 B1 | 10/2012 | Chang et al. |
| 8,296,229 B1 | 10/2012 | Yellin et al. |
| 8,312,033 B1 | 11/2012 | McMillan |
| 8,321,339 B2 | 11/2012 | Imrey et al. |
| 8,321,952 B2 | 11/2012 | Spalink et al. |
| 8,326,672 B2 | 12/2012 | Haggerty et al. |
| 8,355,967 B2 | 1/2013 | Debie et al. |
| 8,364,518 B1 | 1/2013 | Blake et al. |
| 8,386,377 B1 | 2/2013 | Xiong et al. |
| 8,392,334 B2 | 3/2013 | Hirtenstein et al. |

(56) References Cited

U.S. PATENT DOCUMENTS

| | | |
|---|---|---|
| 8,458,074 B2 | 6/2013 | Showalter |
| 8,463,919 B2 | 6/2013 | Tarquini et al. |
| 8,468,198 B2 | 6/2013 | Tomkow |
| 8,478,674 B1 | 7/2013 | Kapczynski et al. |
| 8,515,828 B1 | 8/2013 | Wolf et al. |
| 8,515,862 B2 | 8/2013 | Zhang et al. |
| 8,560,434 B2 | 10/2013 | Morris et al. |
| 8,560,436 B2 | 10/2013 | Ingram et al. |
| 8,566,141 B1 | 10/2013 | Nagdev et al. |
| 8,572,083 B1 | 10/2013 | Snell et al. |
| 8,583,593 B1 | 11/2013 | Achanta |
| 8,606,666 B1 | 12/2013 | Courbage et al. |
| 8,639,616 B1 | 1/2014 | Rolenaitis et al. |
| 8,639,920 B2 | 1/2014 | Stack et al. |
| 8,705,718 B2 | 4/2014 | Baniak et al. |
| 8,725,613 B1 | 5/2014 | Celka et al. |
| 8,738,515 B2 | 5/2014 | Chaudhuri et al. |
| 8,738,516 B1 | 5/2014 | Dean et al. |
| 8,768,914 B2 | 7/2014 | Scriffignano et al. |
| 8,775,299 B2 | 7/2014 | Achanta et al. |
| 8,781,953 B2 | 7/2014 | Kasower |
| 8,782,217 B1 | 7/2014 | Arone et al. |
| 8,818,888 B1 | 8/2014 | Kapczynski et al. |
| 8,954,459 B1 | 2/2015 | McMillan et al. |
| 8,966,649 B2 | 2/2015 | Stack et al. |
| 8,972,400 B1 | 3/2015 | Kapczynski et al. |
| 2001/0000536 A1 | 4/2001 | Tarin |
| 2001/0011245 A1 | 8/2001 | Duhon |
| 2001/0029470 A1 | 10/2001 | Schultz et al. |
| 2001/0029482 A1 | 10/2001 | Tealdi et al. |
| 2001/0037332 A1 | 11/2001 | Miller et al. |
| 2001/0039532 A1 | 11/2001 | Coleman, Jr. et al. |
| 2001/0049274 A1 | 12/2001 | Degraeve |
| 2001/0049620 A1 | 12/2001 | Blasko |
| 2002/0004736 A1 | 1/2002 | Roundtree et al. |
| 2002/0010664 A1 | 1/2002 | Rabideau et al. |
| 2002/0010701 A1 | 1/2002 | Kosciuszko |
| 2002/0013827 A1 | 1/2002 | Edstrom et al. |
| 2002/0026507 A1 | 2/2002 | Sears et al. |
| 2002/0026519 A1 | 2/2002 | Itabashi et al. |
| 2002/0033846 A1 | 3/2002 | Balasubramanian et al. |
| 2002/0038312 A1 | 3/2002 | Donner et al. |
| 2002/0049701 A1 | 4/2002 | Nabe et al. |
| 2002/0049738 A1 | 4/2002 | Epstein |
| 2002/0052884 A1 | 5/2002 | Farber et al. |
| 2002/0069122 A1 | 6/2002 | Yun et al. |
| 2002/0077964 A1 | 6/2002 | Brody et al. |
| 2002/0082892 A1 | 6/2002 | Raffel et al. |
| 2002/0091650 A1 | 7/2002 | Ellis |
| 2002/0091706 A1 | 7/2002 | Anderson et al. |
| 2002/0099628 A1 | 7/2002 | Yakaoka et al. |
| 2002/0099824 A1 | 7/2002 | Bender et al. |
| 2002/0099936 A1 | 7/2002 | Kou et al. |
| 2002/0103809 A1 | 8/2002 | Starzl et al. |
| 2002/0103933 A1 | 8/2002 | Garon et al. |
| 2002/0111816 A1 | 8/2002 | Lortscher et al. |
| 2002/0111910 A1 | 8/2002 | Walsh |
| 2002/0120757 A1 | 8/2002 | Sutherland et al. |
| 2002/0128962 A1 | 9/2002 | Kasower |
| 2002/0131565 A1 | 9/2002 | Scheuring et al. |
| 2002/0133504 A1 | 9/2002 | Vlahos et al. |
| 2002/0138297 A1 | 9/2002 | Lee |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0156676 A1 | 10/2002 | Ahrens et al. |
| 2002/0156797 A1 | 10/2002 | Lee et al. |
| 2002/0161496 A1 | 10/2002 | Yamaki |
| 2002/0161664 A1 | 10/2002 | Shaya et al. |
| 2002/0165757 A1 | 11/2002 | Lisser |
| 2002/0169747 A1 | 11/2002 | Chapman et al. |
| 2002/0173984 A1 | 11/2002 | Robertson et al. |
| 2002/0184255 A1 | 12/2002 | Edd et al. |
| 2002/0188544 A1 | 12/2002 | Wizon et al. |
| 2002/0198800 A1 | 12/2002 | Shamrakov |
| 2002/0198824 A1 | 12/2002 | Cook |
| 2003/0002671 A1 | 1/2003 | Inchalik et al. |
| 2003/0009418 A1 | 1/2003 | Green et al. |
| 2003/0018549 A1 | 1/2003 | Fei et al. |
| 2003/0018578 A1 | 1/2003 | Schultz |
| 2003/0023531 A1 | 1/2003 | Fergusson |
| 2003/0041050 A1 | 2/2003 | Smith et al. |
| 2003/0046311 A1 | 3/2003 | Baidya et al. |
| 2003/0050882 A1 | 3/2003 | Degen et al. |
| 2003/0069839 A1 | 4/2003 | Whittington et al. |
| 2003/0069943 A1 | 4/2003 | Bahrs et al. |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105728 A1 | 6/2003 | Yano et al. |
| 2003/0105733 A1 | 6/2003 | Boreham |
| 2003/0105742 A1 | 6/2003 | Boreham et al. |
| 2003/0115133 A1 | 6/2003 | Bian |
| 2003/0153299 A1 | 8/2003 | Perfit et al. |
| 2003/0158776 A1 | 8/2003 | Landesmann |
| 2003/0163513 A1 | 8/2003 | Schaeck et al. |
| 2003/0171942 A1 | 9/2003 | Gaito |
| 2003/0191731 A1 | 10/2003 | Stewart et al. |
| 2003/0195859 A1 | 10/2003 | Lawrence |
| 2003/0200151 A1 | 10/2003 | Ellenson et al. |
| 2003/0204429 A1 | 10/2003 | Botscheck et al. |
| 2003/0212654 A1 | 11/2003 | Harper et al. |
| 2003/0220858 A1 | 11/2003 | Lam et al. |
| 2003/0229892 A1 | 12/2003 | Sardera |
| 2004/0006488 A1 | 1/2004 | Fitall et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0019799 A1 | 1/2004 | Vering et al. |
| 2004/0030649 A1 | 2/2004 | Nelson et al. |
| 2004/0044673 A1 | 3/2004 | Brady et al. |
| 2004/0052357 A1 | 3/2004 | Logan et al. |
| 2004/0083215 A1 | 4/2004 | de Jong |
| 2004/0088237 A1 | 5/2004 | Moenickheim et al. |
| 2004/0088255 A1 | 5/2004 | Zielke et al. |
| 2004/0098625 A1 | 5/2004 | Lagadec et al. |
| 2004/0103147 A1 | 5/2004 | Flesher et al. |
| 2004/0107250 A1 | 6/2004 | Marciano |
| 2004/0111359 A1 | 6/2004 | Hudock |
| 2004/0117358 A1 | 6/2004 | Von Kaenel et al. |
| 2004/0122696 A1 | 6/2004 | Beringer |
| 2004/0128150 A1 | 7/2004 | Lundegren |
| 2004/0128156 A1 | 7/2004 | Beringer et al. |
| 2004/0128230 A1 | 7/2004 | Oppenheimer et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0139025 A1 | 7/2004 | Coleman |
| 2004/0141005 A1 | 7/2004 | Banatwala et al. |
| 2004/0143482 A1 | 7/2004 | Tivey et al. |
| 2004/0143546 A1 | 7/2004 | Wood et al. |
| 2004/0143596 A1 | 7/2004 | Sirkin |
| 2004/0153330 A1 | 8/2004 | Miller et al. |
| 2004/0153448 A1 | 8/2004 | Cheng et al. |
| 2004/0153521 A1 | 8/2004 | Kogo |
| 2004/0167793 A1 | 8/2004 | Masuoka et al. |
| 2004/0176995 A1 | 9/2004 | Fusz |
| 2004/0193538 A1 | 9/2004 | Raines |
| 2004/0199456 A1 | 10/2004 | Flint et al. |
| 2004/0199789 A1 | 10/2004 | Shaw et al. |
| 2004/0204948 A1 | 10/2004 | Singletary et al. |
| 2004/0220865 A1 | 11/2004 | Lozowski et al. |
| 2004/0220896 A1 | 11/2004 | Finlay et al. |
| 2004/0220918 A1 | 11/2004 | Scriffignano et al. |
| 2004/0221043 A1 | 11/2004 | Su et al. |
| 2004/0225594 A1 | 11/2004 | Nolan, III et al. |
| 2004/0225596 A1 | 11/2004 | Kemper et al. |
| 2004/0225643 A1 | 11/2004 | Alpha et al. |
| 2004/0230527 A1 | 11/2004 | Hansen et al. |
| 2004/0230534 A1 | 11/2004 | McGough |
| 2004/0243588 A1 | 12/2004 | Tanner et al. |
| 2004/0254935 A1 | 12/2004 | Chagoly et al. |

(56) References Cited

U.S. PATENT DOCUMENTS

| | | |
|---|---|---|
| 2004/0267714 A1 | 12/2004 | Frid et al. |
| 2005/0005168 A1 | 1/2005 | Dick |
| 2005/0010513 A1 | 1/2005 | Duckworth et al. |
| 2005/0010555 A1 | 1/2005 | Gallivan |
| 2005/0027983 A1 | 2/2005 | Klawon |
| 2005/0027995 A1 | 2/2005 | Menschik et al. |
| 2005/0038737 A1 | 2/2005 | Norris |
| 2005/0044036 A1 | 2/2005 | Harrington et al. |
| 2005/0049991 A1 | 3/2005 | Aggarwal |
| 2005/0055231 A1 | 3/2005 | Lee |
| 2005/0058262 A1 | 3/2005 | Timmins et al. |
| 2005/0060332 A1 | 3/2005 | Bernstein et al. |
| 2005/0065809 A1 | 3/2005 | Henze |
| 2005/0071328 A1 | 3/2005 | Lawrence |
| 2005/0080821 A1 | 4/2005 | Breil et al. |
| 2005/0091164 A1 | 4/2005 | Varble |
| 2005/0097039 A1 | 5/2005 | Kulcsar et al. |
| 2005/0102180 A1 | 5/2005 | Gailey et al. |
| 2005/0108041 A1 | 5/2005 | White |
| 2005/0108396 A1 | 5/2005 | Bittner |
| 2005/0108631 A1 | 5/2005 | Amorin et al. |
| 2005/0113991 A1 | 5/2005 | Rogers et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0131760 A1 | 6/2005 | Manning et al. |
| 2005/0137899 A1 | 6/2005 | Davies et al. |
| 2005/0144452 A1 | 6/2005 | Lynch et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0171859 A1 | 8/2005 | Harrington et al. |
| 2005/0187948 A1 | 8/2005 | Monitzer et al. |
| 2005/0192008 A1 | 9/2005 | Desai et al. |
| 2005/0208461 A1 | 9/2005 | Krebs et al. |
| 2005/0209922 A1 | 9/2005 | Hofmeister |
| 2005/0226224 A1 | 10/2005 | Lee et al. |
| 2005/0246338 A1 | 11/2005 | Bird |
| 2005/0257250 A1 | 11/2005 | Mitchell et al. |
| 2005/0262158 A1 | 11/2005 | Sauermann |
| 2005/0273849 A1 | 12/2005 | Araujo et al. |
| 2005/0288998 A1 | 12/2005 | Verma et al. |
| 2006/0004731 A1 | 1/2006 | Seibel et al. |
| 2006/0015425 A1 | 1/2006 | Brooks |
| 2006/0020611 A1 | 1/2006 | Gilbert et al. |
| 2006/0029107 A1 | 2/2006 | McCullough et al. |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041464 A1 | 2/2006 | Powers et al. |
| 2006/0041500 A1 | 2/2006 | Diana et al. |
| 2006/0041670 A1 | 2/2006 | Musseleck et al. |
| 2006/0059110 A1 | 3/2006 | Madhok et al. |
| 2006/0064340 A1 | 3/2006 | Cook |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080233 A1 | 4/2006 | Mendelovich et al. |
| 2006/0080251 A1 | 4/2006 | Fried et al. |
| 2006/0085361 A1 | 4/2006 | Hoerle et al. |
| 2006/0085454 A1 | 4/2006 | Blegen et al. |
| 2006/0106668 A1 | 5/2006 | Kim et al. |
| 2006/0129419 A1 | 6/2006 | Flaxer et al. |
| 2006/0129422 A1 | 6/2006 | Kim et al. |
| 2006/0136330 A1 | 6/2006 | DeRoy et al. |
| 2006/0136595 A1 | 6/2006 | Satyavolu |
| 2006/0143695 A1 | 6/2006 | Grynberg |
| 2006/0149674 A1 | 7/2006 | Cook et al. |
| 2006/0155573 A1 | 7/2006 | Hartunian |
| 2006/0155780 A1 | 7/2006 | Sakairi et al. |
| 2006/0161435 A1 | 7/2006 | Atef et al. |
| 2006/0161554 A1 | 7/2006 | Lucovsky et al. |
| 2006/0179050 A1 | 8/2006 | Giang et al. |
| 2006/0184440 A1 | 8/2006 | Britti et al. |
| 2006/0184585 A1 | 8/2006 | Grear et al. |
| 2006/0195688 A1 | 8/2006 | Drissi et al. |
| 2006/0218407 A1 | 9/2006 | Toms |
| 2006/0229799 A1 | 10/2006 | Nimmo et al. |
| 2006/0229943 A1 | 10/2006 | Mathias et al. |
| 2006/0229961 A1 | 10/2006 | Lyftogt et al. |
| 2006/0235935 A1 | 10/2006 | Ng |
| 2006/0242047 A1 | 10/2006 | Haggerty et al. |
| 2006/0253323 A1 | 11/2006 | Phan et al. |
| 2006/0253358 A1 | 11/2006 | Delgrosso et al. |
| 2006/0265259 A1 | 11/2006 | Diana et al. |
| 2006/0271457 A1 | 11/2006 | Romain et al. |
| 2006/0271472 A1 | 11/2006 | Cagan |
| 2006/0276171 A1 | 12/2006 | Pousti |
| 2006/0277089 A1 | 12/2006 | Hubbard et al. |
| 2006/0277092 A1 | 12/2006 | Williams |
| 2006/0277141 A1 | 12/2006 | Palmer |
| 2006/0282359 A1 | 12/2006 | Nobili et al. |
| 2006/0282429 A1 | 12/2006 | Hernandez-Sherrington et al. |
| 2006/0282819 A1 | 12/2006 | Graham et al. |
| 2006/0288090 A1 | 12/2006 | Kraft |
| 2006/0293979 A1 | 12/2006 | Cash et al. |
| 2006/0294199 A1 | 12/2006 | Bertholf |
| 2007/0011020 A1 | 1/2007 | Martin |
| 2007/0022141 A1 | 1/2007 | Singleton et al. |
| 2007/0022297 A1 | 1/2007 | Britti et al. |
| 2007/0027778 A1 | 2/2007 | Schellhammer et al. |
| 2007/0030282 A1 | 2/2007 | Cash et al. |
| 2007/0038483 A1 | 2/2007 | Wood |
| 2007/0038497 A1 | 2/2007 | Britti et al. |
| 2007/0047714 A1 | 3/2007 | Baniak et al. |
| 2007/0067297 A1 | 3/2007 | Kublickis |
| 2007/0067437 A1 | 3/2007 | Sindambiwe |
| 2007/0094230 A1 | 4/2007 | Subramaniam et al. |
| 2007/0094241 A1 | 4/2007 | Blackwell et al. |
| 2007/0094264 A1 | 4/2007 | Nair |
| 2007/0112582 A1 | 5/2007 | Fenlon |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0130070 A1 | 6/2007 | Williams |
| 2007/0156554 A1 | 7/2007 | Nikoley et al. |
| 2007/0156589 A1 | 7/2007 | Zimler et al. |
| 2007/0162414 A1 | 7/2007 | Horowitz et al. |
| 2007/0174122 A1 | 7/2007 | Howard et al. |
| 2007/0185797 A1 | 8/2007 | Robinson |
| 2007/0192122 A1 | 8/2007 | Routson et al. |
| 2007/0204338 A1 | 8/2007 | Aiello et al. |
| 2007/0208640 A1 | 9/2007 | Banasiak et al. |
| 2007/0214000 A1 | 9/2007 | Shahrabi et al. |
| 2007/0220611 A1 | 9/2007 | Socolow et al. |
| 2007/0226010 A1 | 9/2007 | Larsen |
| 2007/0226093 A1 | 9/2007 | Chan et al. |
| 2007/0226129 A1 | 9/2007 | Liao et al. |
| 2007/0244782 A1 | 10/2007 | Chimento |
| 2007/0250441 A1 | 10/2007 | Paulsen et al. |
| 2007/0250459 A1 | 10/2007 | Schwarz et al. |
| 2007/0261114 A1 | 11/2007 | Pomerantsev |
| 2007/0282730 A1 | 12/2007 | Carpenter et al. |
| 2007/0282736 A1 | 12/2007 | Conlin et al. |
| 2007/0284433 A1 | 12/2007 | Domenica et al. |
| 2007/0288360 A1 | 12/2007 | Seeklus |
| 2007/0294431 A1 | 12/2007 | Adelman et al. |
| 2007/0299759 A1 | 12/2007 | Kelly |
| 2008/0010206 A1 | 1/2008 | Coleman |
| 2008/0021804 A1 | 1/2008 | Deckoff |
| 2008/0027858 A1 | 1/2008 | Benson |
| 2008/0028067 A1 | 1/2008 | Berkhin et al. |
| 2008/0033742 A1 | 2/2008 | Bernasconi |
| 2008/0033956 A1 | 2/2008 | Saha et al. |
| 2008/0052182 A1 | 2/2008 | Marshall |
| 2008/0052244 A1 | 2/2008 | Tsuei et al. |
| 2008/0059224 A1 | 3/2008 | Schechter |
| 2008/0059449 A1 | 3/2008 | Webster et al. |
| 2008/0072316 A1 | 3/2008 | Chang et al. |
| 2008/0082536 A1 | 4/2008 | Schwabe et al. |
| 2008/0109445 A1 | 5/2008 | Williams et al. |
| 2008/0109875 A1 | 5/2008 | Kraft |
| 2008/0115191 A1 | 5/2008 | Kim et al. |
| 2008/0120569 A1 | 5/2008 | Mann et al. |

(56) References Cited

U.S. PATENT DOCUMENTS

| | | |
|---|---|---|
| 2008/0162383 A1 | 7/2008 | Kraft |
| 2008/0177655 A1 | 7/2008 | Zalik |
| 2008/0183504 A1 | 7/2008 | Highley |
| 2008/0183564 A1 | 7/2008 | Tien et al. |
| 2008/0184270 A1 | 7/2008 | Cole et al. |
| 2008/0201401 A1 | 8/2008 | Pugh et al. |
| 2008/0205655 A1 | 8/2008 | Wilkins et al. |
| 2008/0208735 A1 | 8/2008 | Balet et al. |
| 2008/0208873 A1 | 8/2008 | Boehmer |
| 2008/0249869 A1 | 10/2008 | Angell et al. |
| 2008/0263058 A1 | 10/2008 | Peden |
| 2008/0270209 A1 | 10/2008 | Mauseth et al. |
| 2008/0270294 A1 | 10/2008 | Lent et al. |
| 2008/0288283 A1 | 11/2008 | Baldwin, Jr. et al. |
| 2008/0288361 A1 | 11/2008 | Rego et al. |
| 2008/0300962 A1 | 12/2008 | Cawston et al. |
| 2008/0301016 A1 | 12/2008 | Durvasula et al. |
| 2008/0301188 A1 | 12/2008 | O'Hara |
| 2008/0306750 A1 | 12/2008 | Wunder et al. |
| 2008/0312969 A1 | 12/2008 | Raines et al. |
| 2008/0319889 A1 | 12/2008 | Hammad |
| 2008/0320575 A1 | 12/2008 | Gelb et al. |
| 2009/0006475 A1 | 1/2009 | Udezue et al. |
| 2009/0018996 A1 | 1/2009 | Hunt et al. |
| 2009/0024428 A1 | 1/2009 | Hudock, Jr. |
| 2009/0024505 A1 | 1/2009 | Patel et al. |
| 2009/0031426 A1 | 1/2009 | Dal Lago et al. |
| 2009/0043691 A1 | 2/2009 | Kasower |
| 2009/0048877 A1 | 2/2009 | Binns et al. |
| 2009/0055894 A1 | 2/2009 | Lorsch |
| 2009/0060343 A1 | 3/2009 | Rosca |
| 2009/0094237 A1 | 4/2009 | Churi et al. |
| 2009/0094674 A1 | 4/2009 | Schwartz et al. |
| 2009/0106846 A1 | 4/2009 | Dupray et al. |
| 2009/0112650 A1 | 4/2009 | Iwane |
| 2009/0113532 A1 | 4/2009 | Lapidous |
| 2009/0119169 A1 | 5/2009 | Chandratillake et al. |
| 2009/0126013 A1 | 5/2009 | Atwood et al. |
| 2009/0138335 A1 | 5/2009 | Lieberman |
| 2009/0144102 A1 | 6/2009 | Lopez |
| 2009/0150166 A1 | 6/2009 | Leite et al. |
| 2009/0150238 A1 | 6/2009 | Marsh et al. |
| 2009/0164232 A1 | 6/2009 | Chmielewski et al. |
| 2009/0164380 A1 | 6/2009 | Brown |
| 2009/0183259 A1 | 7/2009 | Rinek et al. |
| 2009/0210807 A1 | 8/2009 | Xiao et al. |
| 2009/0216640 A1 | 8/2009 | Masi |
| 2009/0228918 A1 | 9/2009 | Rolff et al. |
| 2009/0234665 A1 | 9/2009 | Conkel |
| 2009/0234876 A1 | 9/2009 | Schigel et al. |
| 2009/0240609 A1 | 9/2009 | Cho et al. |
| 2009/0249440 A1 | 10/2009 | Platt et al. |
| 2009/0254375 A1 | 10/2009 | Martinez et al. |
| 2009/0254656 A1 | 10/2009 | Vignisson et al. |
| 2009/0254971 A1 | 10/2009 | Herz et al. |
| 2009/0271265 A1 | 10/2009 | Lay et al. |
| 2009/0313049 A1 | 12/2009 | Joao et al. |
| 2009/0313562 A1 | 12/2009 | Appleyard et al. |
| 2009/0327120 A1 | 12/2009 | Eze et al. |
| 2009/0328173 A1 | 12/2009 | Jakobson et al. |
| 2010/0010935 A1 | 1/2010 | Shelton |
| 2010/0011428 A1 | 1/2010 | Atwood et al. |
| 2010/0023434 A1 | 1/2010 | Bond |
| 2010/0030578 A1 | 2/2010 | Siddique et al. |
| 2010/0030677 A1 | 2/2010 | Melik-Aslanian et al. |
| 2010/0049803 A1 | 2/2010 | Ogilvie et al. |
| 2010/0094704 A1 | 4/2010 | Subramanian et al. |
| 2010/0094758 A1 | 4/2010 | Chamberlain et al. |
| 2010/0114724 A1 | 5/2010 | Ghosh et al. |
| 2010/0114747 A1 | 5/2010 | Kasower |
| 2010/0145836 A1 | 6/2010 | Baker et al. |
| 2010/0145840 A1 | 6/2010 | Kasower |
| 2010/0169159 A1 | 7/2010 | Rose et al. |
| 2010/0169264 A1 | 7/2010 | O'Sullivan |
| 2010/0185546 A1 | 7/2010 | Pollard |
| 2010/0205076 A1 | 8/2010 | Parson et al. |
| 2010/0211636 A1 | 8/2010 | Starkenburg et al. |
| 2010/0217837 A1 | 8/2010 | Ansari et al. |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250497 A1 | 9/2010 | Redlich et al. |
| 2010/0268660 A1 | 10/2010 | Ekdahl |
| 2011/0009707 A1 | 1/2011 | Kaundinya et al. |
| 2011/0016042 A1 | 1/2011 | Cho et al. |
| 2011/0023115 A1 | 1/2011 | Wright |
| 2011/0029388 A1 | 2/2011 | Kendall et al. |
| 2011/0060905 A1 | 3/2011 | Stack et al. |
| 2011/0071950 A1 | 3/2011 | Ivanovic |
| 2011/0078073 A1 | 3/2011 | Annappindi et al. |
| 2011/0113084 A1 | 5/2011 | Ramnani |
| 2011/0113086 A1 | 5/2011 | Long et al. |
| 2011/0125595 A1 | 5/2011 | Neal et al. |
| 2011/0126275 A1 | 5/2011 | Anderson et al. |
| 2011/0137760 A1 | 6/2011 | Rudie et al. |
| 2011/0137789 A1 | 6/2011 | Kortina et al. |
| 2011/0142213 A1 | 6/2011 | Baniak et al. |
| 2011/0161218 A1 | 6/2011 | Swift |
| 2011/0164746 A1 | 7/2011 | Nice et al. |
| 2011/0166988 A1 | 7/2011 | Coulter |
| 2011/0178899 A1 | 7/2011 | Huszar |
| 2011/0179139 A1 | 7/2011 | Starkenburg et al. |
| 2011/0184838 A1 | 7/2011 | Winters et al. |
| 2011/0196791 A1 | 8/2011 | Dominguez |
| 2011/0202474 A1 | 8/2011 | Mele et al. |
| 2011/0219421 A1 | 9/2011 | Ullman et al. |
| 2011/0238566 A1 | 9/2011 | Santos |
| 2011/0255688 A1 | 10/2011 | Spalink et al. |
| 2011/0258050 A1 | 10/2011 | Chan et al. |
| 2011/0264566 A1 | 10/2011 | Brown |
| 2012/0011056 A1 | 1/2012 | Ward et al. |
| 2012/0016948 A1 | 1/2012 | Sinha |
| 2012/0029956 A1 | 2/2012 | Ghosh et al. |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0054592 A1 | 3/2012 | Jaffe et al. |
| 2012/0072464 A1 | 3/2012 | Cohen |
| 2012/0078932 A1 | 3/2012 | Skurtovich, Jr. et al. |
| 2012/0095927 A1 | 4/2012 | Hirtenstein et al. |
| 2012/0101939 A1 | 4/2012 | Kasower |
| 2012/0106801 A1 | 5/2012 | Jackson |
| 2012/0110467 A1 | 5/2012 | Blake et al. |
| 2012/0110677 A1 | 5/2012 | Abendroth et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0158654 A1 | 6/2012 | Behren et al. |
| 2012/0173339 A1 | 7/2012 | Flynt et al. |
| 2012/0179536 A1 | 7/2012 | Kalb et al. |
| 2012/0215682 A1 | 8/2012 | Lent et al. |
| 2012/0216125 A1 | 8/2012 | Pierce |
| 2012/0226916 A1 | 9/2012 | Hahn et al. |
| 2012/0265607 A1 | 10/2012 | Belwadi |
| 2012/0290660 A1 | 11/2012 | Rao et al. |
| 2012/0323954 A1 | 12/2012 | Bonalle et al. |
| 2013/0018811 A1 | 1/2013 | Britti et al. |
| 2013/0031109 A1 | 1/2013 | Roulson et al. |
| 2013/0031624 A1 | 1/2013 | Britti et al. |
| 2013/0066676 A1 | 3/2013 | Williams et al. |
| 2013/0125010 A1 | 5/2013 | Strandell |
| 2013/0132151 A1 | 5/2013 | Stibel et al. |
| 2013/0173481 A1 | 7/2013 | Hirtenstein et al. |
| 2013/0185293 A1 | 7/2013 | Boback |
| 2013/0268357 A1 | 10/2013 | Heath |
| 2013/0279676 A1 | 10/2013 | Baniak et al. |
| 2013/0332338 A1 | 12/2013 | Yan et al. |
| 2014/0032265 A1 | 1/2014 | Paprocki et al. |
| 2014/0032300 A1 | 1/2014 | Zhang et al. |
| 2014/0136422 A1 | 5/2014 | Jung et al. |
| 2014/0164519 A1 | 6/2014 | Shah |

(56) References Cited

U.S. PATENT DOCUMENTS

| | | | |
|---|---|---|---|
| 2014/0244353 | A1 | 8/2014 | Winters |
| 2014/0279329 | A1 | 9/2014 | Dancel |

FOREIGN PATENT DOCUMENTS

| | | |
|---|---|---|
| EP | 0 559 358 | 9/1993 |
| EP | 0 977 128 | 2/2000 |
| EP | 1 077 419 | 2/2001 |
| EP | 0 772 836 | 12/2001 |
| EP | 1 850 278 | 10/2007 |
| EP | 2 088 743 | 8/2009 |
| GB | 1 322 809 | 7/1973 |
| JP | 10-222559 | 8/1998 |
| JP | 10-261009 | 9/1998 |
| JP | 10-293732 | 11/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2004-0078798 | 9/2004 |
| RU | 2 181 216 | 4/2002 |
| WO | WO 95/34155 | 12/1995 |
| WO | WO 96/00945 | 1/1996 |
| WO | WO 98/41931 | 9/1998 |
| WO | WO 98/41932 | 9/1998 |
| WO | WO 98/41933 | 9/1998 |
| WO | WO 98/49643 | 11/1998 |
| WO | WO 99/17225 | 4/1999 |
| WO | WO 99/17226 | 4/1999 |
| WO | WO 99/38094 | 7/1999 |
| WO | WO 00/04465 | 1/2000 |
| WO | WO 00/28441 | 5/2000 |
| WO | WO 00/55778 | 9/2000 |
| WO | WO 00/65469 | 11/2000 |
| WO | WO 01/09752 | 2/2001 |
| WO | WO 01/09792 | 2/2001 |
| WO | WO 01/10090 | 2/2001 |
| WO | WO 01/84281 | 11/2001 |
| WO | WO 2004/031986 | 4/2004 |
| WO | WO 2004/114160 | 12/2004 |
| WO | WO 2005/036859 | 4/2005 |
| WO | WO 2006/050278 | 5/2006 |
| WO | WO 2006/110873 | 10/2006 |
| WO | WO 2008/022289 | 2/2008 |
| WO | WO 2008/042614 | 4/2008 |
| WO | WO 2008/054403 | 5/2008 |
| WO | WO 2008/057853 | 5/2008 |
| WO | WO 2009/117518 | 9/2009 |
| WO | WO 2010/062537 | 6/2010 |
| WO | WO 2010/132492 | 11/2010 |
| WO | WO 2010/150251 | 12/2010 |
| WO | WO 2011/005876 | 1/2011 |
| WO | WO 2013/009920 | 1/2013 |
| WO | WO 2014/018900 | 1/2014 |

OTHER PUBLICATIONS

Fenner, Mobile Address Management and Billing for Personal Communications, Universal Personal Communications, 1992. ICUPC '92 Proceedings., 1st International Conference on, Oct. 1992, pp. 09.06/1-09.06/5.*

BlueCava, "What We Do", http://www.bluecava.com/what-we-do/, downloaded on Nov. 5, 2012, 3 pages.

"Debt Settlement: Watch Video on how to Pay Your Debt Faster", http://www.debtconsolidationcare.com/debt-settlement.html printed Jan. 9, 2013 in 6 pages.

Iovation, Device Identification & Device Fingerprinting, http://www.iovation.com/risk-management/device-identification, downloaded on Nov. 5, 2012, 6 pages.

Ogg, Erica, "Apple cracks down on UDID use", http://gigaom.com/apple/apple-cracks-down-on-udid-use/, downloaded on Nov. 5, 2012, 5 pages.

"PremierGuide Announces Release 3.0 of Local Search Platform", Business Wire, p. 5574, Palo Alto, CA, Mar. 4, 2004.

"Qualifying for Debt Settlement", http://www.certifieddebt.com/debt/settlement-qualifications.shtml printed Jan. 9, 2013 in 2 pages.

"Resolve Debt for Less: With Help from Freedom Financial" http://www.debtsettlementusa.com/ printed Jan. 9, 2013 in 6 pages.

"Settling Your Debts—Part 1 in Our Debt Settlement Series", http://www.creditinfocenter.com/debt/settle_debts.shtml printed Jan. 9, 2013 in 6 pages.

U.S. Appl. No. 12/705,489, filed Feb. 12, 2010, Bargoli et al.

U.S. Appl. No. 12/705,511, filed Feb. 12, 2010, Bargoli et al.

"Aggregate and Analyze Social Media Content:Gain Faster and Broader Insight to Market Sentiment"; SAP Partner; Mantis Technology Group; pp. 4; Apr. 2011.

Authenticom, "What's in a Name?", printed Apr. 1, 2009; http://web.archive.org/web/20070708185835/http://www.authenticom.com/story.html in 1 page.

Authenticom, Technical Specs, "Confidence Level Indicators (CLI)", printed Dec. 31, 2005, http://www.authenticom.com/confidence_level_indicators.html in 1 page.

Caliendo, et al., "Some Practical Guidance for the Implementation of Propensity Score Matching"; IZA:Discussion Paper Series; No. 1588; Germany; May 2005.

Chung, Charles; Internet Retailer, "Multi-channel retailing requires the cleanest data—but don't expect it from the customer", Jan./Feb. 2002.

Chores & Allowances. "Do Kids Have Credit Reports?", Oct. 15, 2007, http://choresandallowances.blogspot.com/2007/10/do-kids-have-credit-reports.html.

Dymi, Amilda, Need for Leads Spurs Some Upgrades, Origination News—Special Report, May 1, 2008, vol. 17, Issue No. 8, pp. 24, Atlanta, Copyright 2008 SourceMedia, Inc.

Ettorre, Paul Kahn on Exceptional Marketing. Management Review, vol. 38(11), Nov. 1994, pp. 48-51.

Gibbs, Adrienne; "Protecting Your Children from Identity Theft," Nov. 25, 2008, http://www.creditcards.com/credit-card-news/identity-ID-theft-and-kids-children-1282.php.

Greco, Susan, The Rating Game: Grade your Leads to Clear the Pipe Dreams from you Sales Pipeline, Online Reprint, Jan. 1998, vol. 20, Issue No. 1, p. 93 (1-3).

ID Theft Assist, "Do You Know Where Your Child's Credit is?", Nov. 26, 2007, http://www.idtheftassist.com/pages/story14.

IDEON, Credit-Card Registry that Bellyflopped this Year, is Drawing some Bottom-Fishers, The Wall Street Journal, Aug. 21, 1995, pp. C2.

"Impac Funding Introduces Enhanced Website for Static Pool Tracking of MBS Transactions," Walthham, MA; Webpage printed out from http://www.lewtan.com/press/1208044_Impac-Lewtan.htm on Mar. 20, 2008.

"Intelligent Miner Applications Guide"; Chapters 4-7; pp. 33-132; IBM Corp., Apr. 2, 1999.

"Japan's JAAI system appraises used cars over internet", Asia Pulse, Mar. 3, 2000.

Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.

LeadVerifier: Why Should You Use LeadVerifier?, downloaded www.leadverifier.com/LeadVerifier_Why.asp, dated Feb. from 7, 2006 on www.archive.org.

Leskovec, Jure; "Social Media Analytics: Tracking, Modeling and Predicting the Flow of Information through Networks"; WWW 2011—Tutorial; Mar. 28-Apr. 1, 2011; Hyderabad, India; pp. 277-278.

(56) References Cited

OTHER PUBLICATIONS

Li et al., "Automatic Verbal Information Verification for User Authentication", IEEE Transactions on Speech and Audio Processing, vol. 8, No. 5, Sep. 2000, pp. 585-596.
LifeLock; "How can LifeLock protect my kids and family?," http://www.lifelock.com/lifelock-for-people/how-we-do-it/how-can-lifelock-protect-my-kids-and-family, accessed Mar. 14, 2008.
Loshin, Intelligent Enterprise: Better Insight for Business Decisions, "Value-Added Data: Merge Ahead", Feb. 9, 2000, vol. 3, No. 3, 5 pages.
Miller, Joe, "NADA used-car prices go online", Automotive News, Jun. 14, 1999, p. 36.
PR Web: Press Release Newswire, Anchor Launches LeadVerifier to Verify, Correct and Enhance Internet Leads, Jul. 19, 2005, pp. 2 pages, Farmingdale, NY.
"PrimeQ Lead Validation Techniques Gets Stronger", http://66.102.7.104/search?g=cache:qXAdm0EXcwYJ:www.primeq.com/absolutenm/anmv . . . , 2 pages, Nov. 29, 2005.
RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.
Real IQ, "Lead Metrix", downloaded from http://www.realiq.com/leadmetrix.html, 1 page, Aug. 17, 2006.
Real IQ, "Mortgage Industry", downloaded from http://www.realiq.com/mortgage.html, 4 pages, Aug. 17, 2006.
Real IQ, RealIQ.com, retrieved from web.archive.org http://replay.web.archive.org/20051212152337/http://www.realiq.com/mortgage.html as printed on Apr. 28, 2011, pp. 2.
Sawyers, Arlena, "NADA to Offer Residual Guide", Automotive News, May 22, 2000, pp. 3.
Sax, Michael M., Data Collection and Privacy Protection: An International Perspective, Presentation: Managing Online Risk and Liability Conference, Aug. 31, 1999, pp. 58.
ServiceObjects, "DOTS Web Services—Product Directory", downloaded from http://www.serviceobjects.com/products/directory_of_web_services.asp, 4 pages, Aug. 17, 2006.
ServiceObjects, "Real-Time Customer Intelligence for a Nickel", downloaded from http://www.serviceobjects.com/products/default.asp, 3 pages, Aug. 17, 2006.
Tao, Lixin, "Shifting Paradigms with the Application Service Provider Model"; Concordia University, Canada; IEEE; Oct. 2001.
TARGUSinfo: Intermark Media Slashes Returned Lead Costs, Improves Affiliate Relations, downloaded from www.targusinfo.com, as printed Apr. 1, 2009, 4 pgs.
TARGUSinfo: Lead Verification, Verify Your Leads With Unique Accuracy and Ease, downloaded from www.targusinfo.com/solutions/verify/Default.asp, Oct. 28, 2005, as printed Aug. 1, 2006.
Thoemmes, Felix, "Propensity Score Matching in SPSS", Center for Educational Science and Psychology, University of Tübingen, Jan. 2012.
Vamosi, Robert, "How to Handle ID Fraud's Youngest Victims," Nov. 21, 2008, http://news.cnet.com/8301-10789_3-10105303-57.html.
"WashingtonPost.com and Cars.com launch comprehensive automotive web site for the Washington area", PR Newswire, Oct. 22, 1998.
Web Decisions, "Live Decisions", downloaded from http://www.webdecisions.com, 2 pages, Sep. 18, 2006.
BackupBox, http://mybackupbox.com printed Feb. 8, 2013 in 2 pages.
Hojoki, http://hojoki.com printed Feb. 8, 2013 in 5 pages.
Hoofnagle, Chris Jay, "Identity Theft: Making the Known Unknowns Known," Harvard Journal of Law & Technology, Fall 2007, vol. 21, No. 1, pp. 98-122.
IFTTT, "About IFTTT", http://ifttt.com/wtf printed Feb. 18, 2013 in 4 pages.
LifeLock, Various Pages, http://lifelock.com/, 2007 in 49 pages.
Mover, "One API for the Cloud", http://mover.io printed Feb. 6, 2013 in 3 pages.
Otixo, "Your Dashboard for the Cloud", http://Otixo.com/product printed Feb. 6, 2013 in 3 pages.
Pipes, http://pipes.yahoo.com/pipes printed Feb. 18, 2013 in 1 page.
Primadesk, http://primadesk.com printed Feb. 8, 2013 in 1 page.
Storage Made Easy(SME), http://www.storagemadeeasy.com printed Feb. 6, 2013 in 1 page.
Zapier, "Integrate Your Web Services", http://www.zapier.com, printed Feb. 18, 2013 in 3 pages.
Actuate, "Delivering Enterprise Information for Corporate Portals", White Paper, 2004, pp. 1-7.
Akl, Selim G., "Digital Signatures: A Tutorial Survey," Computer, Feb. 1983, pp. 15-24.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
Bitran et al., "Mailing Decisions in Catalog Sales Industry", Management Science (JSTOR), vol. 42, No. 9, pp. 1364-1381, Sep. 1996.
Brick, et al. "Unit and Item Response, Weighting, and Imputation Procedures in the 1993 National Household Education Survey (NHES:93)" U.S. Department of Education. National Center for Education Statistics, Working Paper No. 97-05, Washington, D.C., pp. 30, Feb. 1997.
Burr Ph.D., et al., "Utility Payments as Alternative Credit Data: A Reality Check", Asset Builders of America, Inc., Oct. 5, 2006, pp. 1-18, Washington, D.C.
Buxfer, http://www.buxfer.com/ printed Feb. 5, 2014 in 1 page.
Cáceres, et al., "Measurement and Analysis of IP Network Usage and Behavior", IEEE Communications Magazine, pp. 144-151, May 2000.
Census Geography, Excerpted from the Geographic Reference Manual, Nov. 1994, pp. 5.
Check, http://check.me/ printed Feb. 5, 2014 in 3 pages.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003.
Cohen et al., "Optimizer: IBM's Multi Echelon Inventory System for Managing Service Logistics", Interfaces, vol. 20, pp. 65-82, Jan.-Feb. 1990.
"D&B Corporate Family Linkage", D&B Internet Access for U.S. Contract Customers, <https://www.dnb.com/ecomp/help/linkage.htm> as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Davies, Donald W., "Applying the RSA Digital Signature to Electronic Mail," Computer, Feb. 1983, pp. 55-62.
Elmasri et al., "Fundamentals of Database Systems, Third Edition (Excerpts)", Jun. 2000, pp. 253, 261, 268-70, 278-80, 585, 595.
Experian: Improve Outcomes Through Applied Customer Insight, Brochure, Nov. 2009, pp. 20.
Experian: Mosaic Geodemographic Lifestyle Segmentation on ConsumerView [Data Card], as printed from http://datacards.experian.com/market?page=research/datacard_print&prin, Apr. 6, 2012, pp. 4.
Experian: Mosaic Public Sector 2009 Launch, 2009, pp. 164.
Experian: Mosaic United Kingdom, Brochure, Jun. 2009, pp. 24.
Experian: Mosaic UK—Optimise the Value of Your Customers and Locations, Now and in the Future, Brochure, Sep. 2010, pp. 24.
Experian: Mosaic UK—Unique Consumer Classification Based on In-Depth Demographic Data, as printed from http://www.experian.co.uk/business-strategies/mosaic-uk.html, Jul. 30, 2012, pp. 2.
Experian: Mosaic USA, Brochure, May 2009, pp. 14.
Experian: Mosaic USA—Consumer Lifestyle Segmentation [Data Card], Dec. 2009, pp. 2.
Experian: Public Sector, as printed form http://publicsector.experian.co.uk/Products/Mosaicpublicsector.aspx, 2012, pp. 2.
Experian, "Experian Rental Payment Data," <http://www.experian.com/rentbureau/rental-data.html> printed Nov. 22, 2013 in 2 pages.

(56) References Cited

OTHER PUBLICATIONS

"Fictitious Business Name Records", Westlaw Database Directory, <http://directoy.westlaw.com/scope/default.asp?db=FBN-ALL &RS-W...&VR=2.0> as printed Dec. 17, 2009, pp. 5.

Fisher, Joseph, "Access to Fair Credit Reports: Current Practices and Proposed Legislation," American Business Law Journal, Fall 1981, vol. 19, No. 3, p. 319.

Garcia-Molina, "Database Systems: The Complete Book", Prentice Hall, 2002, pp. 713-715.

"GLBA Compliance and FFIEC Compliance" http://www.trustwave.com/financial-services.php printed Apr. 8, 2013 in 1 page.

Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.

Handfield, Robert B. et al., "Managing Component Life Cycles in Dynamic Technological Environments", International Journal of Purchasing and Materials Management, Tempe, vol. 30, No. 2, pp. 20-28, Spring 1994, ProQuest ID 590096.

Herron, Janna, "Social Media-Based Credit Score?", <http://www.bankrate.com/financing/credit-cards/social-media-based-credit-score/>, posted Friday, Jan. 13, 2012, printed Nov. 22, 2013 in 2 pages.

Inderfurth et al., "Decision Support for Spare Parts Acquisition in Post Product Life Cycle", Central European Journal of Operations Research, vol. 16, pp. 17-42, 2008 [Initially published online Dec. 21, 2007].

Jaro, Matthew A., "Probabilistic Linkage of Large Public Health Data Files," Statistics in Medicine, 1995, vol. 14, pp. 491-498.

Käki, Anssi, "Forecasting in End-Of-Life Spare Parts Procurement", Master's Thesis—Helsinki University of Technology System Analysis Laboratory, Jul. 27, 2007.

Kim, Bowon et al., Optimal Pricing, EOL (End of Life) Warranty, and Spare Parts Manufacturing Strategy Amid Product Transition, European Journal of Operation Research, vol. 188, pp. 723-745, 2008 [Initially published online May 1, 2007].

Klein, et al., "A Constant-Utility Index of the Cost of Living", The Review of Economic Studies, pp. 84-87, vol. XV-XVI, Kraus Reprint Corporation, New York, 1960.

Klein, et al., "An Econometric Model of the United States: 1929-1952", North-Holland Publishing Company, Amsterdam, 1955, pp. 4-41.

Klein, Lawrence R., "The Keynesian Revolution", New York, The MacMillan Company, 1947, pp. 56-189.

Krupp, James A.G.; "Forecasting for the Automotive Aftermarket"; The Journal of Business Forecasting Methods & Systems; Winter 1993-1994; 12, 4; ABI/Inform Global; pp. 8-12.

Lapide, Larry, "New Developments in Business Forecasting", The Journal of Business Forecasting, pp. 12-14, Spring 2002.

LendingTree.com, "Lender Ratings & Reviews," <http://web.archive.org/web/20091015043716/http://www.lendingtree.com/lender-reviews/>, Oct. 15, 2009, in 21 pages.

Lobo, Jude, "MySAP.com Enterprise Portal Cookbook," SAP Technical Delivery, Feb. 2002, vol. 1, pp. 1-13.

Manilla, http://www.manilla.com/how-it-works/ printed Feb. 5, 2014 in 1 page.

McNamara, Paul, "Start-up's pitch: The Envelope, please," Network World, Apr. 28, 1997, vol. 14, No. 17, p. 33.

Medick et al., "German Agency to Mine Facebook to Assess Creditworthiness", Jun. 7, 2012, <http://www.spiegel.de/international/germany/german-credit-agency-plans-to-analyze-individual-facebook-pages-a-837539.html> printed Nov. 22, 2013 in 2 pages.

MicroBilt, "PRBC Credit Reporting Agency—Payment Reporting Builds Credit," retrieved from <http://www.microbilt.com/nontraditional-credit-report.aspx> and corresponding "Sample Report," retrieved from <http://www.microbilt.com/pdfs/PRBC%20Sample%20Report%20(complete).pdf> printed Nov. 21, 2013 in 8 pages.

Microfinance Africa, "Philippines: Microfinance Players to get Their Own Credit Info Bureau," Apr. 5, 2011, <http://microfinanceafrica.net/microfinance-around-the-world/philippines-microfinance-players-to-get-their-own-credit-info-bureau/> printed Nov. 22, 2013 in 2 pages.

Microsoft, "Expand the Reach of Your Business," Microsoft Business Solutions, 2004, in 16 pages.

Mint.com, http://www.mint.com/how-it-works/ printed Feb. 5, 2013 in 2 pages.

Moore, John R., Jr. "Forecasting and Scheduling for Past-Model Replacement Parts" Management Science, Application Series, vol. 18, No. 4, Part 1, Dec. 1971, pp. B200-B213.

"Mosaic" (geodemography), available from http://en.wikipedia.org/wiki/Mosaic_(geodemography), as last modified Jul. 13, 2012. pp. 4.

Mvelopes, http://www.mvelopes.conn/ printed Feb. 5, 2014 in 2 pages.

MyReceipts, <http://www.myreceipts.com/>, printed Oct. 16, 2012 in 1 page.

MyReceipts—How it Works, <http://www.myreceipts.com/howItWorks.do>, printed Oct. 16, 2012 in 1 page.

"Name Availability Records", Westlaw Database Directory, <http://directoy.westlaw.com/scope/default.asp?db=NA-ALL&RS=W...&VR=2.0> as printed Dec. 17, 2009, pp. 5.

Organizing Maniac's Blog—Online Receipts Provided by MyQuickReceipts.com, http://organizingmaniacs.wordpress.com/2011/01/12/online-receipts-provided-by-myquickreceipts-com/ dated Jan. 12, 2011 printed Oct. 16, 2012 in 3 pages.

Packer, A. H., "Simulation and Adaptive Forecasting an Applied to Inventory Control", Operations Research, vol. 15, No. 4, pp. 660-679, Jul. 1965.

"Parse", Definition from PC Magazine Encyclopedia, <http://www/pcmag.com/encyclopedia_term_0,2542,t=parse&i=48862,00.asp> as downloaded Mar. 5, 2012.

PersonalCapital.com, http://www.personalcapital.com/how-it-works printed Feb. 5, 2014 in 5 pages.

Peters, Peter-Paul, "A Spare Parts Configurator for the European Service Business" (Graduation Report); Honeywell, Industrial Service Logistic Center; Amsterdam, The Netherlands; 80 Pgs.; Mar. 2000.

Planet Receipt—Home, http://www.planetreceipt.com/home printed Oct. 16, 2012 in 1 page.

Planet Receipt—Solutions & Features, http://www.planetreceipt.com/solutions-features printed Oct. 16, 2012 in 2 pages.

Ponniah, Paulraj, "Data Warehousing Fundamentals: A Comprehensive Guide for IT Professionals", Wiley-Interscience Publication, pp. 257-289, 377-397, Aug. 3, 2001.

Porter, G. Zell, "An Economic Method for Evaluating Electronic Component Obsolescence Solutions", Retrieved from the web at www.gidep.org/data/dmsms/library/zell.pdf, May 1998, pp. 1-9.

"PostX to Present at Internet Showcase", PR Newswire, Apr. 28, 1997, pp. 2.

PostX, "PostX® Envelope and ActiveView", <http://web.archive.org/web/19970714203719/http://www.postx.com/priducts_fm.html>, Jul. 14, 1997 (retrieved Nov. 7, 2013) in 2 pages.

Rahm, et al. "Data Cleaning: Problems and Current Approaches", Bulletin of the IEEE Computer Society Technical Committee on Data Engineering, Dec. 2000, vol. 23, No. 4, pp. 11.

Raman, et al., "Potter's Wheel: An Interactive Data Cleaning System", Proceedings of the 27th VLDB Conference, Roma, Italy, 2001, pp. 10.

Roos, Gina, "Web-Based Service Helps OEMs Cure Parts Obsolescence Blues", Electronic Engineering Times, p. 86, Oct. 8, 2001, Dialog 09056737 78968668.

Santarini, Michael, "Forecasts the Probable Obsolescence of Components—Module Predicts Parts Life", Electronic Engineering Times, Jan. 11, 1999, p. 48(1), Dialog 0607160353548246.

SAS, "SAS® Information Delivery Portal", Fact Sheet, 2008, in 4 pages.

Schneier, B. "Applied Cryptography", John Wiley & Sons, Second Edition, pp. 435-447, 1996.

ShoeBoxed, https://www.shoeboxed.com/sbx-home/ printed Oct. 16, 2012 in 4 pages.

(56) References Cited

OTHER PUBLICATIONS

Smith, Richard M., "The Web Bug FAQ", Nov. 11, 1999, Version 1.0, pp. 4.

Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.

Stallings, W. "Cryptography and Network Security Principles and Practice", Prentice Hall, Second Edition, pp. 295, 297, Jul. 15, 1998.

Stone, "Linear Expenditure Systems and Demand Analysis: An Application to the Pattern of British Demand", The Economic Journal: The Journal of The Royal Economic Society, Sep. 1954, pp. 511-527, vol. LXIV, Macmillan & Co., London.

Sullivan, Laurie, "Obsolete-Parts Program Thriving", EBN, Manhasset, Issue 1296, p. 26, Jan. 2002, ProQuest 10 101195090.

Various Posts from the http://www.2p.wrox.com Forums: http://web.archive.org/web/2005045221950/http://p2p.wrox.com/topic.asp?TOPIC_ID=6513 , dated Nov. 15, 2003-Oct. 7, 2004.

Web Page posted at: http://web.archive.org/web20040805124909/http://www.oracle.com/technology/sample_codete/tech/pl_sql/htdocs/x/Case/start.htm, pp. 1 and 4 of the webpages posted on Jan. 7, 2003.

Web Pages printed Nov. 2, 2004 of Internet Draft entitled "Tunneling SSL Through a WWW Proxy", Luotonen, Ari, Netscape Communications Corporation (Dec. 14, 1995); 4 pages. http://muffin.doit.org/docs/rfc/tunneling.sub.--ssl.html.

Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.

Webpage printed out from http://www.fairisaac.com/NR/rdonlyres/AC4C2F79-4160-4E44-B0CB-5C899004879A/0/ScoreNetnetworkBR.pdf on Mar. 4, 2008.

Webster, Lee R., "Failure Rates & Life Cycle Costs", Consulting-Specifying Engineer; 23, 4; ABI/Inform Global, Apr. 1998, p. 42.

Williams, Mark, "Results of the 1998 NASFAA Salary Survey", News from NASFAA, 1998.

Working, Holbrook, "Statistical Laws of Family Expenditure", Journal of the American Statistical Association, pp. 43-56, vol. 38, American Statistical Association, Washington, D.C., Mar. 1943.

Yodlee | Money Center, https://yodleemoneycenter.com/ printed Feb. 5, 2014 in 2 pages.

You Need a Budget, http://www.youneedabudget.com/features printed Feb. 5, 2014 in 3 pages.

\* cited by examiner

SYSTEMS AND METHODS FOR DATA VERIFICATION

CROSS-REFERENCE TO RELATED APPLICATIONS

This application is a continuation of U.S. patent application Ser. No. 12/058,632 filed on Mar. 28, 2008, entitled "Systems and Methods for Data Verification," which claims the benefit of priority from U.S. Provisional Patent Application No. 60/921,188 filed on Mar. 30, 2007, entitled "Systems and Methods for Data Verification," the entire contents of which are each hereby incorporated herein by reference in their entirety. All publications and patent applications mentioned in this specification are herein incorporated by reference in their entirety to the same extent as if each individual publication or patent application was specifically and individually indicated to be incorporated by reference.

BACKGROUND

1. Field

The present disclosure relates to the field of data verification, more particularly to improved methods and systems for verifying and/or updating data.

2. Description of the Related Art

Companies increasingly rely on internal and external data relating to their existing or potential customers in order to make critical business strategy decisions. Therefore, a business need exists for systems and methods for verifying the integrity and quality of such data.

SUMMARY OF THE DISCLOSURE

Embodiments are directed to data verification of business or consumer data. One embodiment is a data verification system that receives or selects data to be verified, selects one or more verification methods to be applied to the data, and verifies, updates, and/or appends/enhances the data.

In certain embodiments, the data verification system and/or method is configured to verify one or more types of data. The data may include, for example, business data, non-profit data, government data, credit data, financial data, securities data, consumer data, individual data, pet data, web-posting data, shopping data, email data and the like. In certain embodiments, the data verification system is configured to verify the data in one or more languages or formats or codes or the like.

In certain embodiments, the data verification system is configured to verify data with one or more data verification methods, either alone or in combination. The methods may include a web-crawling verification method, an agent web verification method, a call verification method, a direct-mail method, an email method, an in-person method, and/or other methods. The system may utilize a lower cost method to first verify a larger amount of data records and a higher cost method to verify a smaller amount of data records. The system may segment data into multiple segments/elements and apply a different data verification method to each segment/element.

Certain embodiments of the system comprise an artificial intelligence module that checks the accuracy and costs of the data verification methods as well as other business logic (for example, best time of day/month/year to verify) and dynamically adjusts the usage of the verification methods to meet certain pre-defined business objectives (for example, to achieve the highest accuracy at the lowest cost).

One embodiment is an automated system for verifying data comprising a data selection module configured to select at least a portion of data to be verified, and an artificial intelligence module configured to select one or more data verification methods, based on prior results of the use of the one or more data verification methods, from web-crawling, tele-verification, agent web verification, direct-mail verification, email verification, and in-person verification to apply to the selected portion of the data, wherein the data is verified, updated, or appended as a result the application of the one or more selected data verification methods to the selected portion of the data. In another embodiment, the system may further comprise cost data stored on the system indicating the cost of the data verification methods, and the artificial intelligence module is further configured to select two data verification methods using the cost data for the two data verification methods, wherein the selected data verification method with the lower cost is applied to the selected portion of the data, and the selected data verification method with the higher cost is applied to a subset of the selected portion of the data.

Another embodiment is an automated system for verifying data comprising a data segmentation module configured to segment data to be verified into a plurality of data portions, wherein each data portion comprises a characteristic and an artificial intelligence module configured to select a data verification method to apply to each of the plurality of data portions based on the characteristic of the data portion, wherein data is verified, updated, or appended as a result of the application of the selected data verification method.

Yet another embodiment is an automated method of data verification, comprising: selecting a portion of data to be verified; and selecting one or more data verification methods from web-crawling, tele-verification, agent web verification, direct-mail verification, email verification, and in-person verification to apply to the selected portion of the data, based on prior results of the use of the data verification methods, wherein the data is verified, updated, or appended as a result the application of the one or more data verification methods to the selected portion of the data. In another embodiment, the method may further comprise: storing cost data indicating the cost of data verification methods; and the selecting one or more data verification methods comprises selecting two data verification methods using the cost data for the two data verification methods, wherein the selected data verification method with the lower cost is applied to the selected portion of the data, and the selected data verification method with the higher cost is applied to a subset of the selected portion of the data.

Another embodiment is an automated method for verifying data comprising: segmenting data to be verified into a plurality of data portions, wherein each data portion comprises a characteristic; and selecting a data verification method to apply to each of the plurality of data portions based on the characteristic of the data portion, wherein data is verified, updated, or appended as a result of the application of the selected data verification method.

Another embodiment is a computer program product comprising a computer usable medium having control logic stored therein for causing a computer to verify data, the control logic comprising: a first computer readable program code means for causing the computer to select a portion of data to be verified; and a second computer readable program code means for causing the computer to select one or more data verification methods, based on prior results of the use of the one or more data verification methods, from web-crawling, tele-verification, agent web verification, direct-mail verification, email verification, and in-person verification to apply to the selected portion of the data, wherein the data is verified, updated or appended as a result the application of the one or more selected data verification methods to the selected portion of the data.

Finally, one embodiment is a computer program product comprising a computer usable medium having control logic stored therein for causing a computer to verify data, the control logic comprising: a first computer readable program code means for causing the computer to segment data to be verified into a plurality of data portions, wherein each data portion comprises a characteristic; and a second computer readable program code means for causing the computer to select a data verification method to apply to each of the plurality of data portion based on the characteristic of the data portion, wherein data is verified, updated or appended as a result of the application of the selected data verification method.

BRIEF DESCRIPTION OF THE DRAWINGS

Specific embodiments of the invention will now be described with reference to the following drawings, which are intended to illustrate embodiments of the invention, but not limit the invention.

DETAILED DESCRIPTION OF PREFERRED EMBODIMENTS

To make critical business strategy decisions, companies often rely on internal and external data relating to their existing or potential customers. For example, some companies may conduct target marketing campaigns directed at prospective customers exhibiting characteristics of a certain market demographic, such as households with children located in the Midwest. Accordingly, these companies may obtain a listing of such households from a third party data provider. To ensure that these companies are effectively targeting the desired market segment, it is best for the consumer data to be accurate and updated. Therefore, systems and methods are needed to check and update such consumer data or business data.

The same is true for any sort of business data whether generated internally by a company or obtained from a third party data provider. For example, a company may want to market loan products to small businesses in the restaurant supply industry. However, in many instances companies simply have too much data or not enough resources to check and update the consumer or business data. Furthermore, companies often need some or all of the data on a real-time basis, thereby preferring that such data be verified and updated continuously or periodically. For purposes of summarizing the embodiments of the invention certain aspects, advantages and novel features of the systems and methods for verifying the integrity and quality of data will be described herein. Of course, it is to be understood that not necessarily all such aspects, advantages or features will be embodied in any particular embodiment of the invention.

Data Verification Overview

Figure 1:
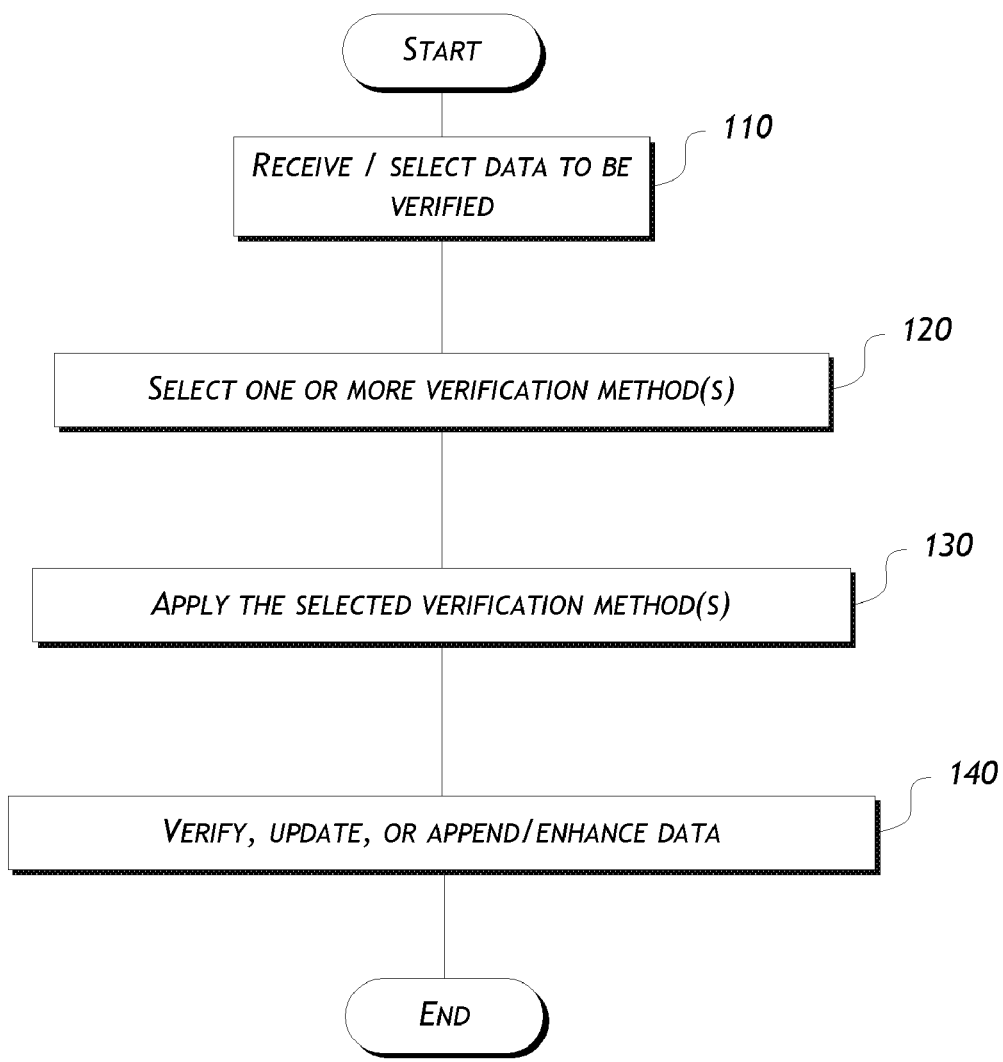
FIG. 1 illustrates a method of data verification according to one embodiment.

FIG. 1 shows a method of data verification in accordance to one embodiment. At block 110, the data verification system receives or selects data to be verified. The system may receive data from an external source, or may select data from a database connected to the system. At block 120, the system selects one or more verification methods to be applied to the data. At block 130, the system applies the selected one or more verification methods to verify the data. At block 140, as a result of the data verification process, data may be verified, updated, and/or appended/enhanced.

In certain embodiments, a data record comprises a plurality of data elements. For example, a data record for a company may comprise data elements such as company name, company size, executive listings, address, and so forth. When a data record is verified, the original content of the record is saved. The record may also be saved along with a time identifier to indicate the time of the verification. When a data record is updated, part of the data record (for example, one or more elements) is altered. For example, the phone number of a company data record may be updated while the address remains unchanged. Finally, when a data record is appended or enhanced, additional information is newly added to the data record. For example, during the verification process it may be discovered that a company has 50 employees. The number of employees will thus be added as a new data element to the record for the company. Another example of appending or enhancing may involve discovering a relationship between two or more data records (for example, company A is a subsidiary of company B or individual A is married to individual B) and adding a relationship link between/among the records.

In certain embodiments, the data verification system and/or method is configured to verify one or more types of data. The data may include, for example, business data, non-profit data, government data, credit data, financial data, securities data, consumer data, individual data, pet data, web-posting data, shopping data, email data and the like. In certain embodiments, the data verification system is configured to verify the data in one or more languages or formats or codes or the like. In certain embodiments, the data verification system is configured to translate or standardize the data into one language, for example English, or into a standard format or code or the like before comparing the data to existing data or before storing the data in a database. Data may be segmented by industries, by types, by data having common elements suitable to be verified by a similar method, and/or by other criteria.

Figure 2:
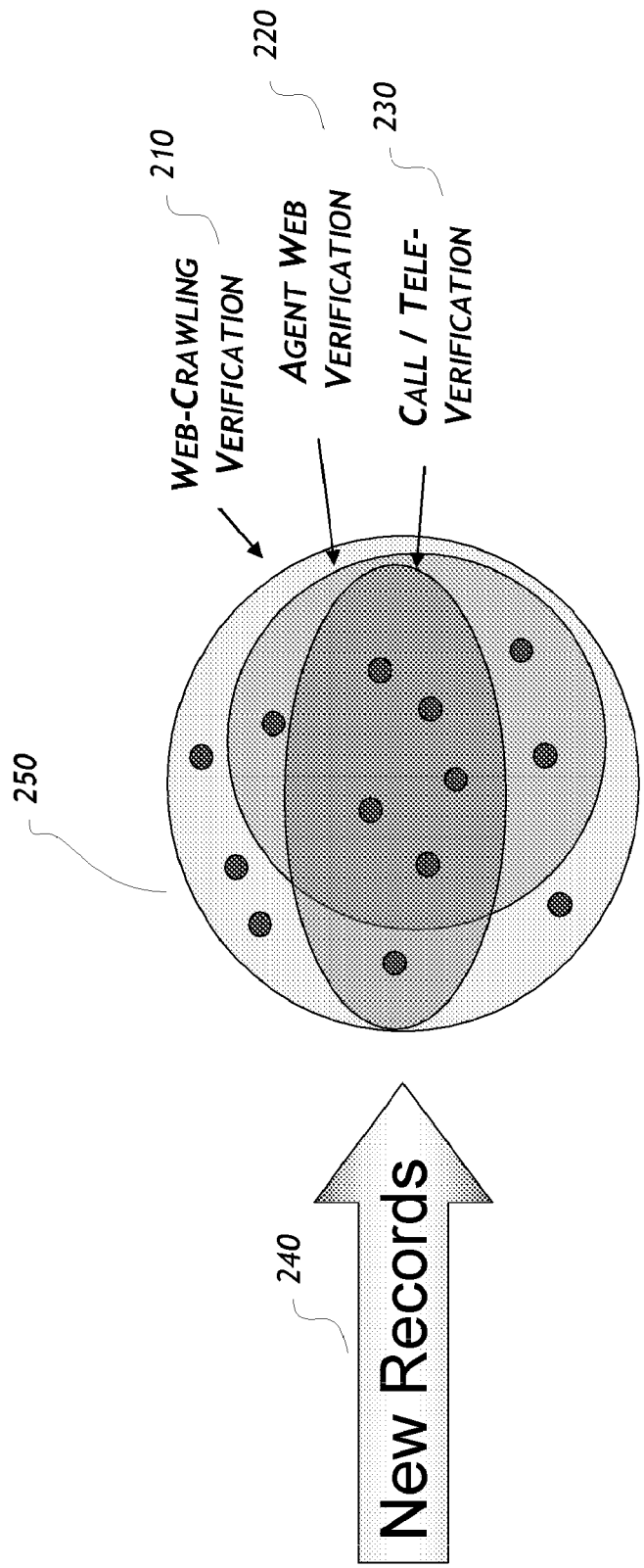
FIG. 2 is a Venn diagram that shows how data verification methods are used in accordance to one embodiment.

FIG. 2 is a Venn diagram that shows how data verification methods are used in accordance to one embodiment. A plurality of new data records 240 may be received into the data verification system. The system selects a portion of data records 250 and applies a specific data verification method to the selected portion. In certain embodiments, the system chooses from a web-crawling verification method 210, an agent web verification method 220, and a call verification/tele-verification method 230. In other embodiments, other verification methods such as direct postal mail, email, or in-person verification may be used as well. As shown in the Venn diagram, some data records (represented by dots) may be verified by multiple methods while some data records may be verified by one method. In other embodiments, some methods will be applied to certain data elements/segments. For example, web-crawling may be applied to verify/update/append the phone number and address elements while call/tele-verification may be applied to verify/update/append other elements such as company names and owner's names.

Figure 3:
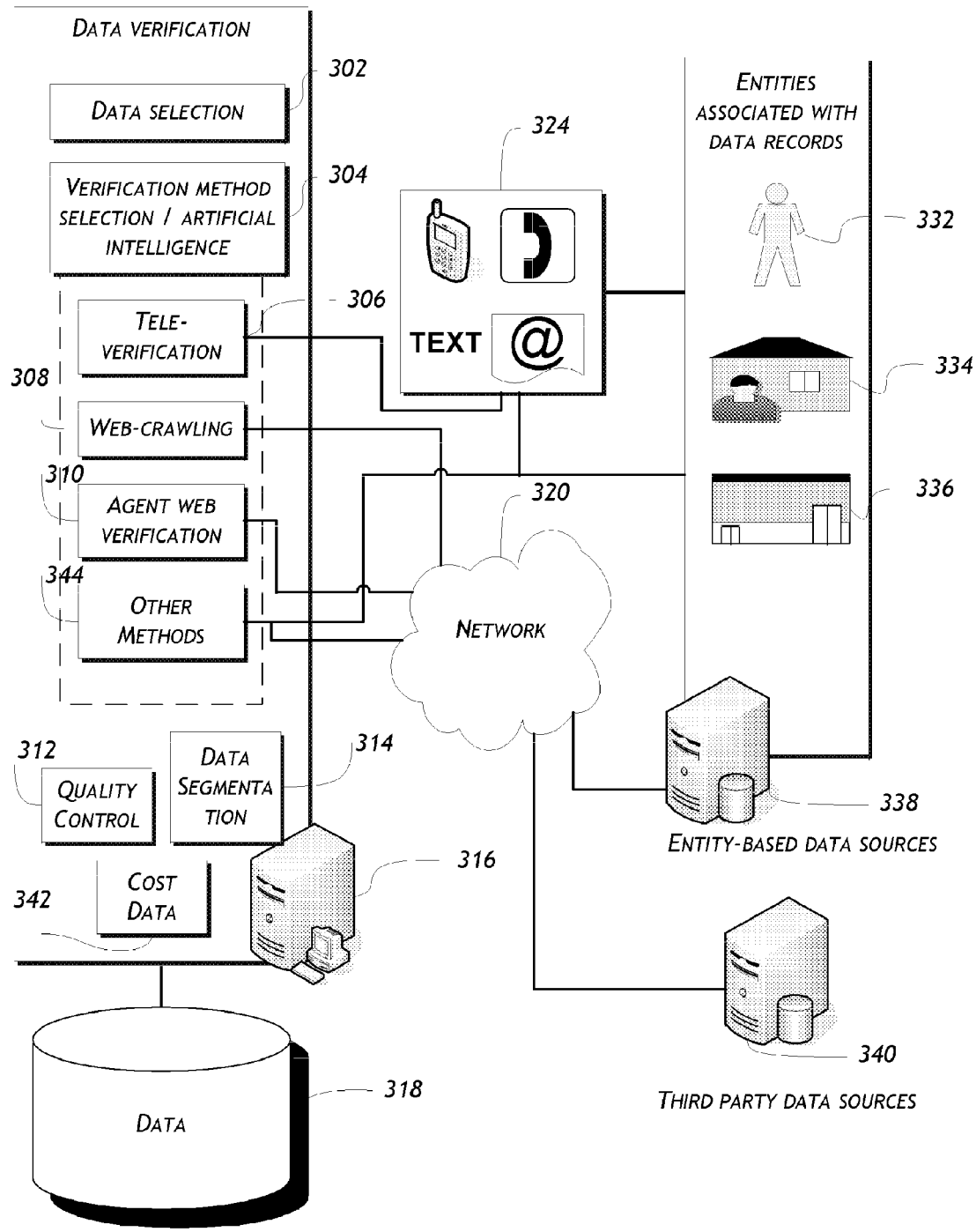
FIG. 3 illustrates an example configuration of a data verification system and its components according to one embodiment.

FIG. 3 shows a data verification system in accordance to one embodiment. A data verification module 300 is a computer executable program executed on a computer server 316. The computer server 316 is in communication with one or more databases 318 that house data.

In certain embodiments, the data verification module 300 includes a data selection module 302, a verification method selection/artificial intelligence module 304, and one or more data verification method modules. The data verification module 300 may additionally include a quality control module 312 and/or a data segmentation module 314. The quality control module 312 performs quality control and/or rank the accuracy of data verification methods in some embodiments. In certain embodiments, the data segmentation module 314 segments data by data elements or segments according to certain characteristics by which data verification method may be selected. The data verification module 300 may include a cost data module 342 to monitor and/or store cost data associated with various data verification methods. Other embodiments combine or separate into fewer or more modules.

The data selection module 302 selects a plurality of data records from the one or more database(s) 318 for the verification. In certain embodiments, the verification method selection/artificial intelligence module 304 selects one or more data verification modules to execute (within the dotted box in FIG. 3). The selection may be based in part on a set of business rules, some of which may maximize cost, efficiency, and accuracy of the various verification methods, or may be based in part on the artificial intelligence module 304 monitoring and learning the performance of various verification methods and adjusting the selection accordingly.

In the sample embodiment shown in FIG. 3, the data verification method modules include a tele-verification module 306, a web-crawling module 308, an agent web verification module 310, and an other verification methods module 344, which may include methods such as direct mail, in-person verification, and so forth. In certain embodiments, the tele-verification module 306 contacts entities associated with the selected data records through communication channels 324. The entities may be individuals 332, households 334, or businesses 336. The term "entity" as used herein can comprise without limitation individuals, households, businesses, non-profit organizations, governments, or the like. Communications channels 324 may include telephone, cellphone, text messaging, email, or the like. The web-crawling module 308 may communicate through a network 320 (for example, internet, local area network (LAN), wide area network (WAN), wireless network) to access information located on data sources 338, which may be maintained by entities associated with the data records to be verified. The web-crawling module 308 may also access data located on other third-party data sources 340 such as commercial data sources or governmental data sources. Finally, the agent web verification module 310 may similarly access information maintained on data sources 338, data sources 340 and/or other available sources. These verification method modules verify, update, and/or amend/enhance the selected data records. Each of these data verification methods is further described below.

Web-Crawling

In certain embodiments, the data verification system and/or method selects at least a portion of the data to be verified, and causes the selected data to be verified by the web-crawling-type methodology or web-crawling module 308. In certain embodiments, the terms "web-crawler" or "web-crawling" as used herein include without limitation, for example, web spider, web robot, watching, scraping, harvesting, content monitoring, extraction or other like technologies. In certain embodiments, the web-crawling module 308 comprises a computer program system that selects certain data and compares the data with similar data obtained from searching sources, such as via the internet.

By way of example and with reference to FIG. 3, web-crawling module 308 may access data sources 338 and/or 340. For example, the web-crawling module 308 may extract information from a personal page maintained by an individual 332 on a social network site 340. Alternatively, the web-crawling module 308 may extract information from a web site on the company server 338 maintained by a business 336. In addition, the web crawling module 308 may search several internet data sources 340, including but not limited to company websites, directories, search engines, chamber of commerce websites, yellow page directories, white page directories, government data, directory data, chamber of commerce data, franchise data, business financial data, business owner data, securities reports or filing data, news article data, press release data, online databases, and the like. The web crawling module 308 may utilize data findings for corroboration of other data sources as well. For example, certain data elements or data records for certain industry segments may require three sources of corroboration before a verify, an update, and/or an append is executed. The web-crawling results for may thus be one source of that corroboration. In one embodiment, the administrator of the data verification system may set a system-wide or segment-specific policy to decide how many additional sources of corroboration are required before the web-crawling results are used to verify, update, and/or append.

In certain embodiments, web-crawling is performed worldwide on data sources located anywhere in the world. In certain embodiments, the data verification system compares and updates the data based on the data found from the web-crawling. In certain embodiments, the various internet data sources have a pre-determined trustworthiness ranking. In certain embodiments, the web-crawling method or program uses such trustworthiness ranking to determine whether to update consumer data based on the data from a particular internet data source.

In certain embodiments, the data verification system completes the web-crawler comparing and updating automatically. In certain embodiments, automatic updating is completed where there is no discrepancy between the data and the data obtained from one or more of the several internet data sources. In certain embodiments, automatic updating is completed when the internet data source has a high trustworthiness ranking. In certain embodiments, the data verification system presents to an operator the original data, and the data found from the web-crawling. In certain embodiments, an operator of the data verification system compares the original data with the data found from web-crawling and based on such a comparison, the operator directs the data verification system to update the data with or ignore the data found from the web-crawling. In certain embodiments, the operator manually updates the data.

In certain embodiments, web-crawling comprises the use of watching technology that monitors, for example, a certain website for updates to the website such that the data is only updated when website updates are detected. In certain embodiments, the data verification system updates the data when the system receives a notification from the watching technology. In certain embodiments, updates to the website includes without limitation, for example, changes in text, images or other information provided on the website; or increases/decreases in: traffic to the website, number of unique visitors to the website, purchases transacted on the website, average user duration on the website or any other website metrics or analytics; or changes in related business or industry trends, financial market valuations or any other business intelligence indicator. In certain embodiments, the website metrics or analytics is provided by third party providers including without limitation, for example, Google Inc, onestat.com, or the like.

In certain embodiments, the web-crawler automatically determines whether to update the data based on a date and time comparison, wherein, for example, the web-crawler updates the existing data with the new data found on the internet if the internet data comprises a more recent creation date and/or time. In certain embodiments, the web-crawler determines the creation date and time of the newly found internet data by analyzing the date stamp information stored on the webpage or in the code of the webpage. In certain embodiments, the web-crawler or other system is configured to update the existing data with newly found data, and store in a database the corresponding stamp date and/or time information related to the newly found data. In certain embodiments, the stored stamp date and/or time data is compared with newly discovered internet data to determine whether such internet data was more recently created. In addition, to websites, the web-crawler may monitor a variety of systems, data sets, and applications, including a network of computers, application data, database data, and so forth. In certain embodiment embodiments, some or all of the web-crawling may be performed by a third party, such as, for example 365 Media, Velocityscape, and the like. Other embodiments of the foregoing will be apparent to those of ordinary skill in the art from the disclosure herein.

Agent Web Verification

Figure 4:
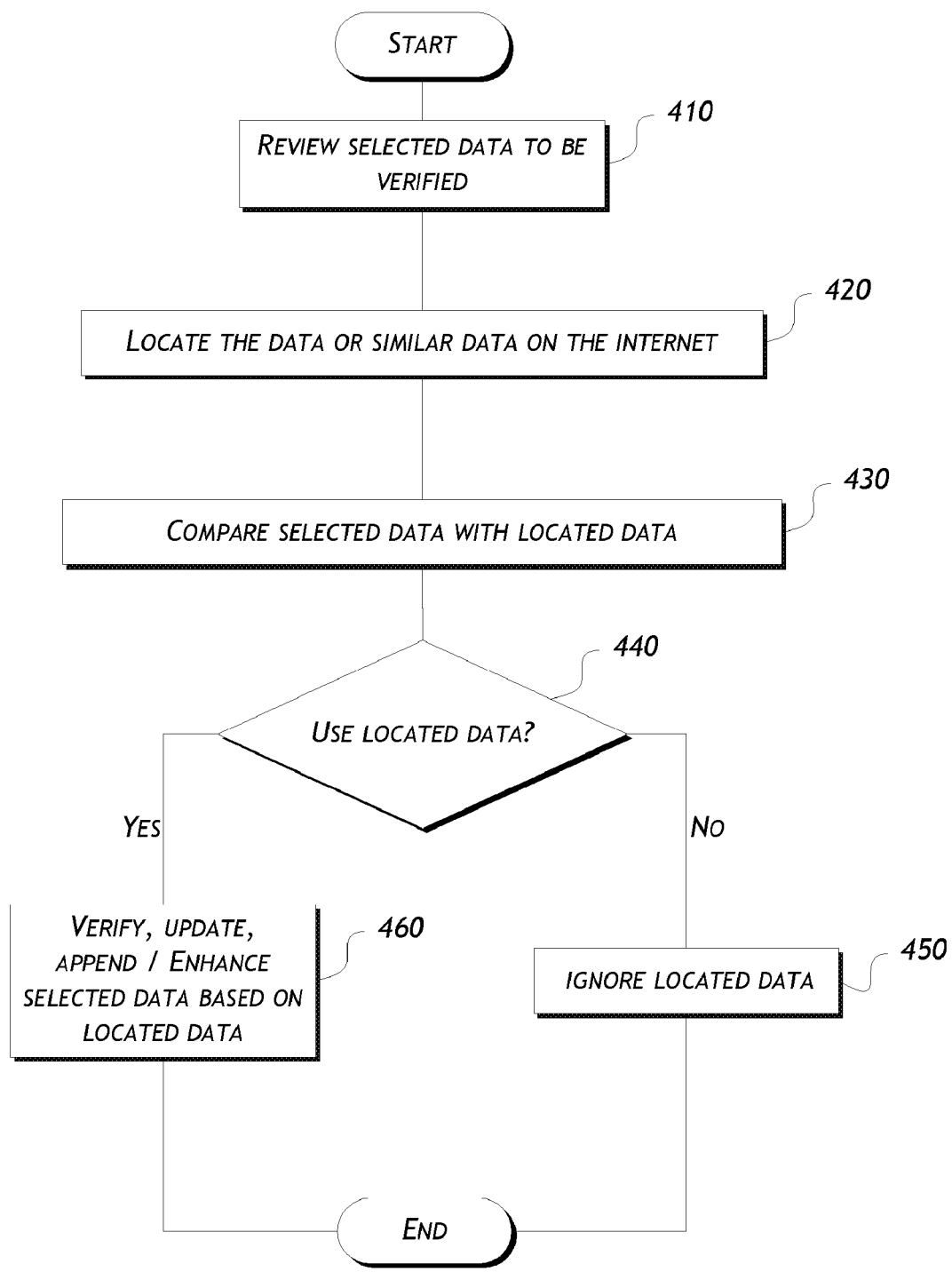
FIG. 4 is a flow diagram of an example web-crawling data verification method according to one embodiment.

In certain embodiments, the data verification system and/or method selects at least a portion of the data to be verified, and causes the selected data to be verified by the agent web verification module 310. FIG. 4 shows one embodiment of the agent web verification method. At block 410, at least one agent, preferably multiple agents, review the selected data. At block 420, the agent(s) locate the data or similar data available on the internet. At block 430, the agent(s) compare the selected data to the data found on the internet in order to verify the quality of the selected data (for example, completeness, accuracy, and so forth). At block 440, the agent(s) determine whether to verify, update, and/or append the selected data based on the data found on the internet. If so, at block 450, the agent(s) update the selected data. Otherwise, at block 460, the agents ignore the located data.

In certain embodiments, agents are located at a central location wherein they have access to the data verification system via one or more network connections, such as, for example, a local area network (LAN) connection or the like. In certain embodiments, agents are located at distributed or multiple locations wherein the agents have access to the data verification system via one or more network connections, such as, for example, a wide area network (WAN) connection or the like.

Call/Tele-Verification

Figure 5:
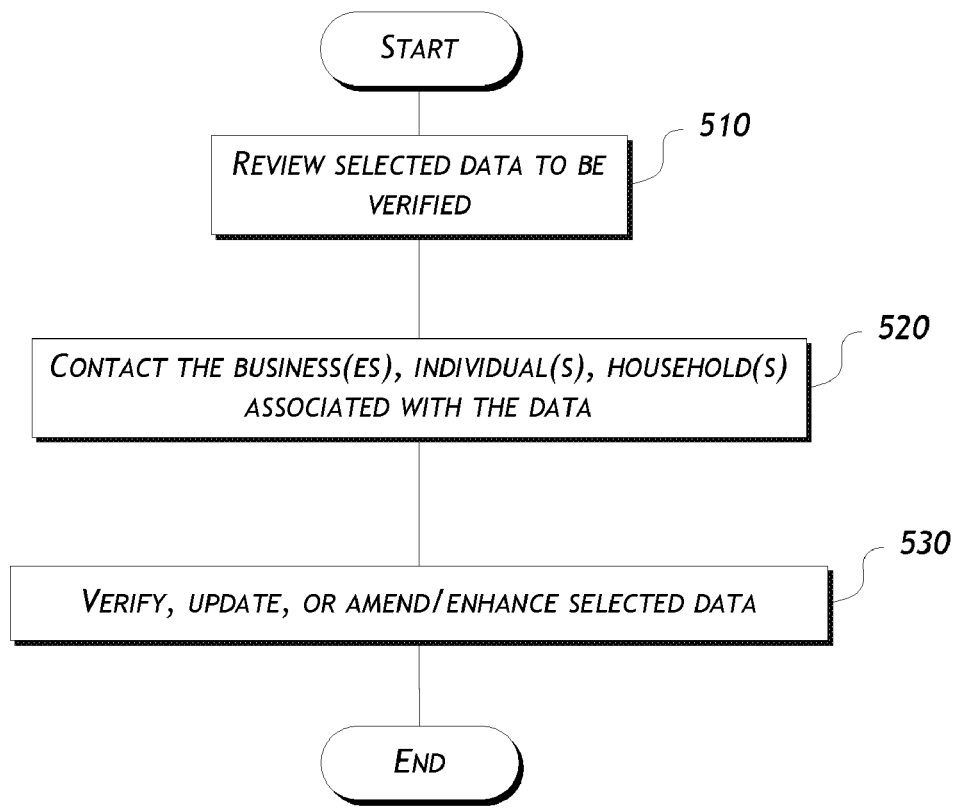
FIG. 5 is a flow diagram of an example tele-verification method according to one embodiment.

In certain embodiments, the data verification system and/or method selects at least a portion of the data to be verified, and causes the selected data to be verified by a call verification methodology. FIG. 5 shows one embodiment of the call verification method, which may be performed by the tele-verification module 306. At block 510, at least one caller, preferably multiple callers, review the selected data. The caller may be a human or may be an automated calling program executed on a computer or an electronic device. At block 520, the caller(s) contact the business(es), the individual(s), the household(s) or other entities associated with the data in order to verify, update, append/enhance the data. At block 530, the caller(s) may verify, update, append/enhance the data based on the results obtained at block 520.

In certain embodiments, the callers use predefined scripts and/or customized scripts in making their calls. Customized scripts may be used for special industry segments. The scripts are configured to increase the number of data points that can be verified and/or to maintain a favorable call experience for the recipient of the call. In certain embodiments, the callers may be monitored by monitoring agents who can provide feedback to the callers to improve future call experiences.

By way of example and with reference to FIG. 3, the tele-verification module 306 or callers may contact individuals 332, households 334, and businesses 336 by various communication channels 324, including telephoning, emailing, mailing, internet calling, text-messaging, instant messaging, video messaging, voice-mailing, faxing or the like.

In certain embodiments, the callers determine whether to update the data with the information received from the contacting or ignore the information received from the contacting. The callers may be located at a central location wherein they have access to the data verification system via a network or the like, or they may be located at multiple locations, for example, a satellite office or the caller's home, wherein the caller has access to the data verification system via a network or the like. In certain embodiments, callers may be located at one or more countries across the globe.

In certain embodiments, the data verification system allows the callers to perform the contacting through the network and over the internet through voice over internet protocol (VOIP) technology. In certain embodiments, the callers are situated or designed to work with a team wherein the team makes calls to verify one or more selected types of data and/or to verify data from one or more selected data types. The teams are segmented to better utilize the callers, and may, for example, be segmented based on strengths and/or weaknesses of the data and/or the callers. For example, certain agents are trained to verify, update, and/or append certain data elements or data records for certain industry segments.

In certain embodiments, some or all of the call verification maybe performed by a third party provider such as, for example, ePerformax, eTelecare, Direct Mail, and the like. Other embodiments of any of the foregoing will be apparent to those of ordinary skill in the art from the disclosure herein.

Hybrid Method

In certain embodiments, the data verification system and/or method uses a combination of at least two of the verification methods described above (web-crawling, agent web verification, call/tele-verification, direct mail, email, in-person or other methods) to verify the data. The verification system includes a verification method selection/artificial intelligence module 304 that selects the appropriate data verification method(s). In certain embodiments, the data verification system and/or method selects at least a portion of the data to be verified by one of the foregoing verification methods, while selecting another portion of the data to be verified by another one of the foregoing verification methods.

Figure 6:
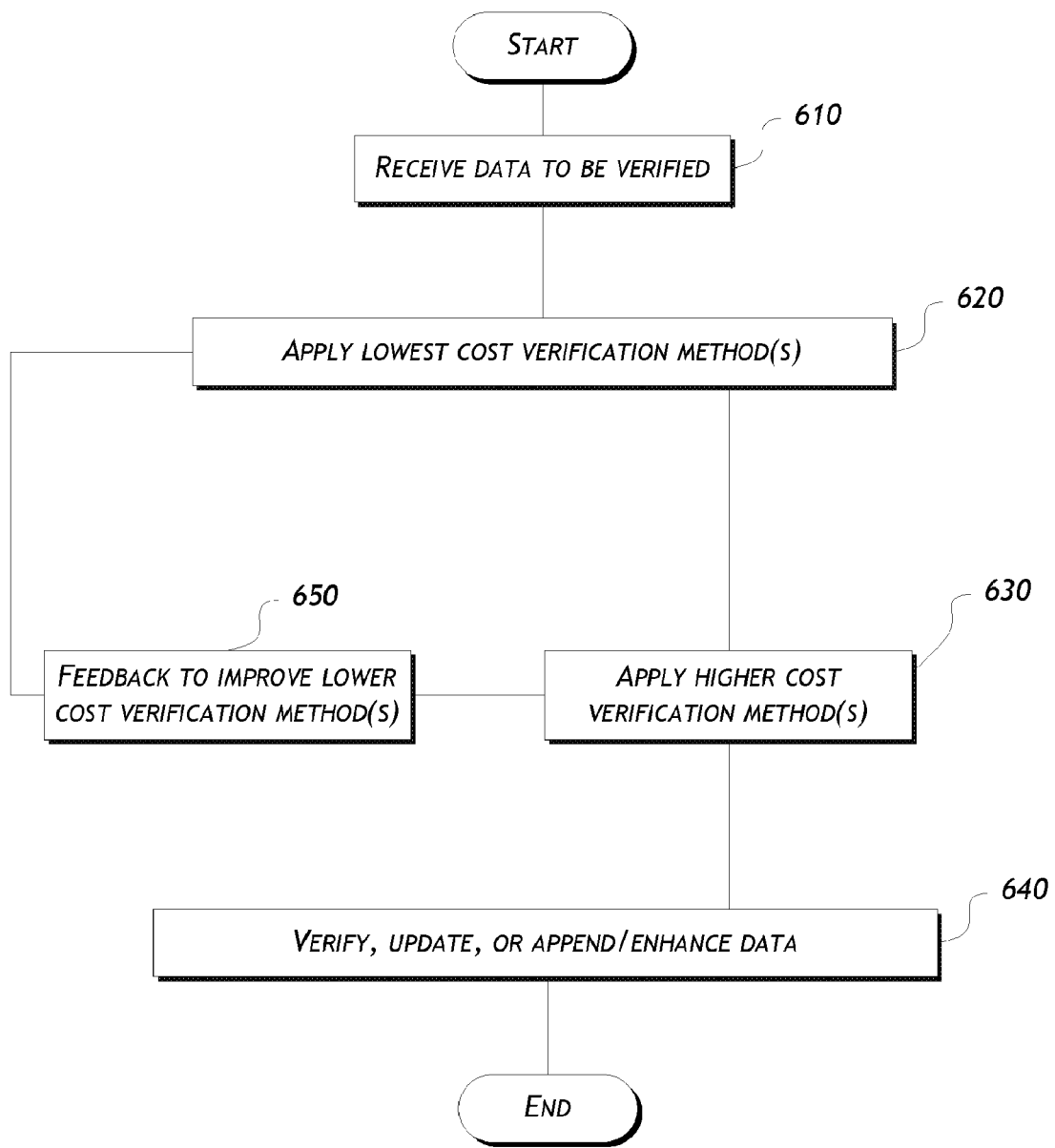
FIG. 6 is a flow diagram showing how data verification methods are selectively applied by segments/elements according to one embodiment.

FIG. 6 shows a sample method of applying data verification methods. At block 610, data to be verified is received. At block 620, a low cost verification method is used to verify the data received at block 610. Then at block 630, a higher cost verification method is used to verify the data. The higher cost verification method may be applied to all the data that is verified by the low cost method at block 620, or may be applied to a portion of the data that is verified by the low cost method. The data is verified, updated, or appended/enhanced depending on the results of the verification performed at block 620 and/or block 630. In certain embodiments, at block 650, the results of the higher cost verification method applied at block 630 are sent back as feedback to improve the results of the low cost verification method. Examples of this feedback may include the types of data records that can be verified solely with a low cost method, or the types of data records that should be verified with a higher cost method. For example, in certain embodiments, the data verification system executes a web-crawling verification method at block 620 and then monitors or tracks the agent's determinations to rank the trustworthiness of the internet data sources at block 630. In certain embodiments, such trustworthiness ranking data is used as feedback at block 650 to improve the accuracy of the web-crawling module executed at block 620. It is recognized that the blocks in FIG. 6 can be rearranged to accommodate various configurations, for example, a higher cost method may be used first.

Data Segmentation

Returning to FIG. 3, in certain embodiments the data verification system includes a data segmentation module 314 that segments data. In certain embodiments, the data verification system and/or method is configured to segment the data to determine which data elements relate to high value customers or clients. For example, the determination of whether a customer or client is high value or otherwise is based on several factors, including but not limited to income, home location, net worth, credit score, and so forth. Based on the segmentation, the data verification system may verify the segmented data relating to high value customers or clients before segmented data relating to lower value customers or clients. Data designated as high value or high priority may be verified by call/tele-verification or by the verification method that is most accurate. In certain embodiments, the data verification system is configured to have high value or high priority data verified by a combination of the foregoing verification methods in order to double check the accuracy of the data (for example, the combination shown in FIG. 6).

In certain embodiments, the data verification system and/or method uses the data verification methodology with the highest or higher accuracy, or highest or higher ranking, as set forth above, to verify the segmented data relating to high value customers or clients. In certain embodiments, the data verification system and/or method uses the data verification methodology with the lowest or lower accuracy or lowest or lower ranking, as set forth above, to verify the segmented data relating to low value customers or clients.

In certain embodiments, the data verification system and/or method uses the data verification methodology with a medium accuracy or medium ranking to verify the segmented data relating to medium value customers or clients. In certain embodiments, the data verification system and/or method is configured to segment the data as soon as the data is received, or on a periodic basis, for example, daily, monthly, yearly or the like. Other embodiments of any of the foregoing will be apparent to those of ordinary skill in the art from the disclosure herein.

In certain embodiments, the data verification system performs a segmentation of the data based on related industry and/or timing, and determines which verification methodology is most or more accurate or least or less expensive for collecting data related to the industry and/or timing. For example, for financial reporting data, the data verification system, in certain embodiments, is configured to use the web-crawling methodology to retrieve financial data from a specific financial data reporting website during earnings reporting season. For example, the web-crawling method may be configured to access 10-K reports of companies two weeks after they are required to file the reports with the Securities and Exchange Commission. In certain embodiments, the data verification system is configured to automatically route the data to be verified to the appropriate verification methodology, for example, call verification wherein the caller is part of a virtual call center that allows the caller to work from home.

In certain embodiments, data is segmented so that new data is verified by higher cost methods, and older data is verified by lower cost methods or vice versa. In other embodiments, data is segmented to ensure proper compliance with local, state, federal, national, and/or international laws/regulations. For example, consumer data may be segmented to take into account that consumer data regulation is stricter than business data regulation. Data may also thus be segmented by geographic locations to ensure proper compliance with local laws and regulations.

Artificial Intelligence

In certain embodiments, the data verification system/method includes an automated, artificial intelligence module 304 that evolves by tracking and learning patterns of successful updates, usability, best practices within segments of data, timing of year/month/day to attain best verification/updates/appends, and so forth. The artificial intelligence module 304 may take into account results generated by both the quality control module 312 and the segmentation module 314. In certain embodiments, the system/method including the artificial intelligence module 304 has the ability to, automatically or manually, (1) blend automatic and manual segmentation of records or elements by criteria such as industry type, best times of day/month/year to verify, update, and/or append, cost, and level of importance (2) select the best verification processing method(s), and (3) manage the results and properly verify, update, append/enhance records.

In certain embodiments, the artificial intelligence module 304 is configured to store and track the time period or season when a particular verification method produces the most or more accurate results and/or least or less expensive results and/or the most or more efficient results. In certain embodiments, the artificial intelligence module 304 is configured to store industry information related to the data such that the system is configured to determine which verification method to use given a particular industry and/or season/time period.

In certain embodiments, under the hybrid method and/or the tele-verification method, the processing of data (full records or specific elements of the records) may run through multi-tiered levels of verification/updates/appends depending on type/segment of data in order to gain the best data with the least related expense. With respect to FIG. 7, the sample multi-tiered method receives data to be verified at block 710. Then data is segmented into a plurality of segments and an appropriate data verification method is determined for each segment. In addition, the order in which the data verification methods are applied may also be determined. In certain embodiments, the data verification methods and their order of execution may be determined by the verification method selection/artificial intelligence module 304.

At block 730, a first data verification method is applied to a first segment of the data. Then, at block 740, a second data verification method is applied to a second segment of the data. Finally, at block 750, a third data verification method is applied to a third segment of the data. As shown by block 760, the number of data verification methods and the number of segments can be any number and are not limited to the example shown in FIG. 7. In addition, the data verification method for each segment does not have to be different, that is, the same data verification method may be applied to multiple segments. At each block where a segment is being verified, the results may be sent as feedback to improve the learning of the verification method selection/artificial intelligence module 304. In addition, at each block where a segment is being verified, data may be verified, updated, or amended/enhanced according to the results of the data verification (block 770). In other embodiments, the data is segmented by different elements and methods of verification are selected based on the characteristics of the elements.

Figure 7:
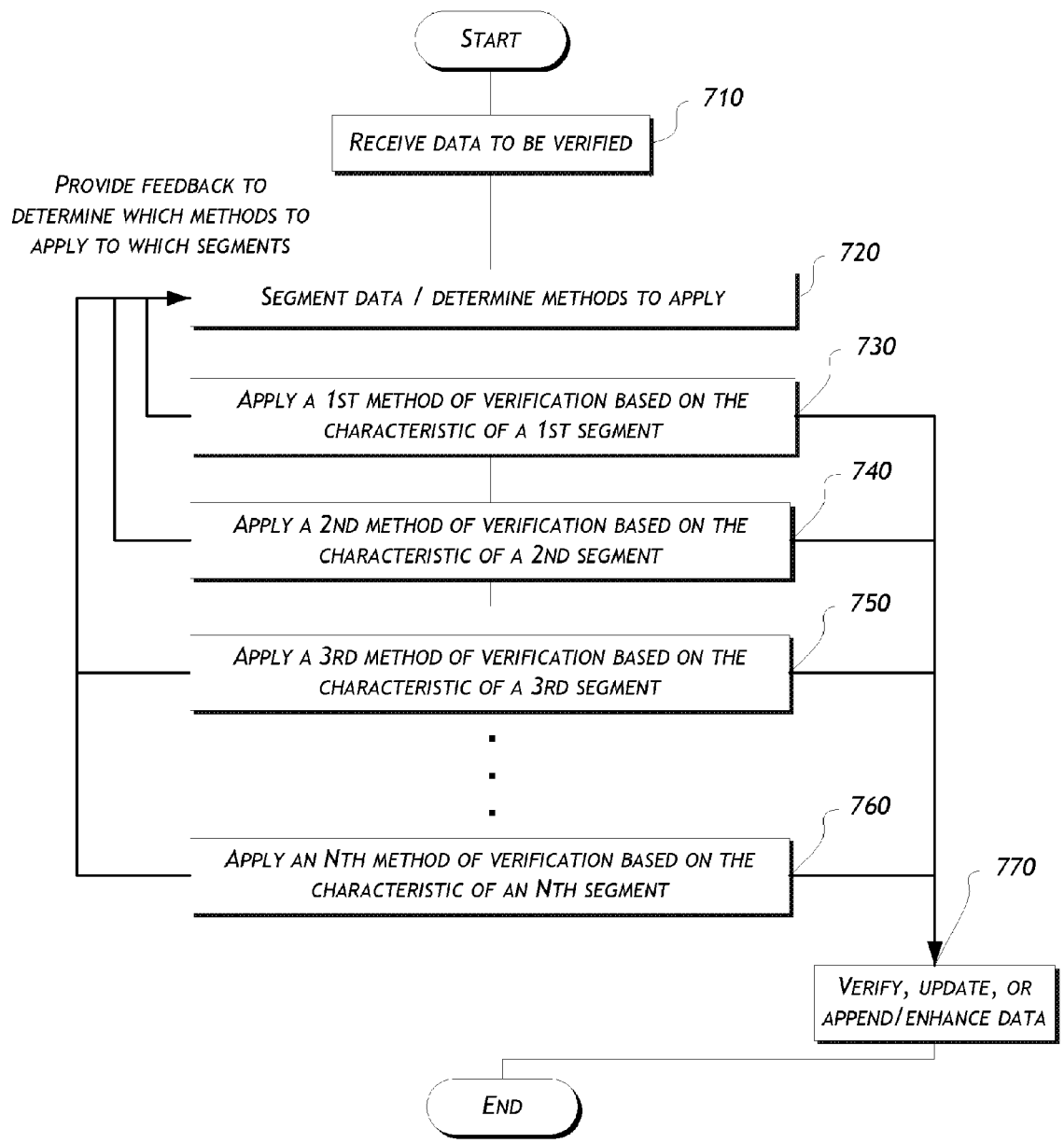
FIG. 7 is a flow diagram showing how data verification methods are selectively applied according to one embodiment.

The method shown in FIG. 7 may be further illustrated by the following example. For data records within the Business Services industry segment, the artificial intelligence module 304 could recognize or learn from feedback obtained from past operations that the best way to verify/update/append this type of data records is by (1) routing the main demographic elements (name, address, phone) to a automated dialing process to test connectivity of phone, (2) using the web-crawling process to extract on-line information or check automated postal deliverability system for address element updates, and (3) sending the data records to the tele-verification method for population of other in-depth data elements. The dialing process may be a one-dial process that puts phones on an automatic dialer during off-hours or on weekends. In one embodiment, the artificial intelligence module selects a lower cost data verification method (for example, web-crawling) for a data segment/element that has a characteristic indicating reliable data is readily available on-line and a higher cost data verification method (for example, agent web verification or tele-verification) for another data segment/element with a characteristic indicating reliable data is not readily available on-line.

In certain embodiments, the data verification system is configured to include one or more methods depending on the cost. Balancing against the cost of each verification method is the fact certain data elements or certain industry segments are more valuable than others. For example, a business name element is more valuable than other details of the business, and a data record in the business segment is more valuable than a data record in the government segment. Therefore, some valuable data elements/segments may be verified by multiple methods, including an expensive method such as call/tele-verification, while other data elements/segments may have a cost threshold that allow only certain data verification methods to be used. The artificial intelligence module may take the cost of verification and the value of the data elements and/or segments into account when it selects the verification method. As another example, the web-crawling may include one or more data sources that charge fees for their use such that using the web-crawling on those data course may exceed a threshold cost. In other embodiments, other costs may be considered.

In certain embodiments, the data verification system is configured to process the data on a real-time basis. In certain embodiments, the data verification system is configured to process the data on a batch processing or periodic basis.

Quality Control/Method Ranking

In certain embodiments, the data verification system is configured to compare the accuracy of the foregoing data verification methods and rank the methods. In certain embodiments, the results of quality control and ranking performed by the quality control module 312 are sent to the artificial intelligence module 304 to assist the learning process and enhance future selection of data verification methods.

Figure 8:
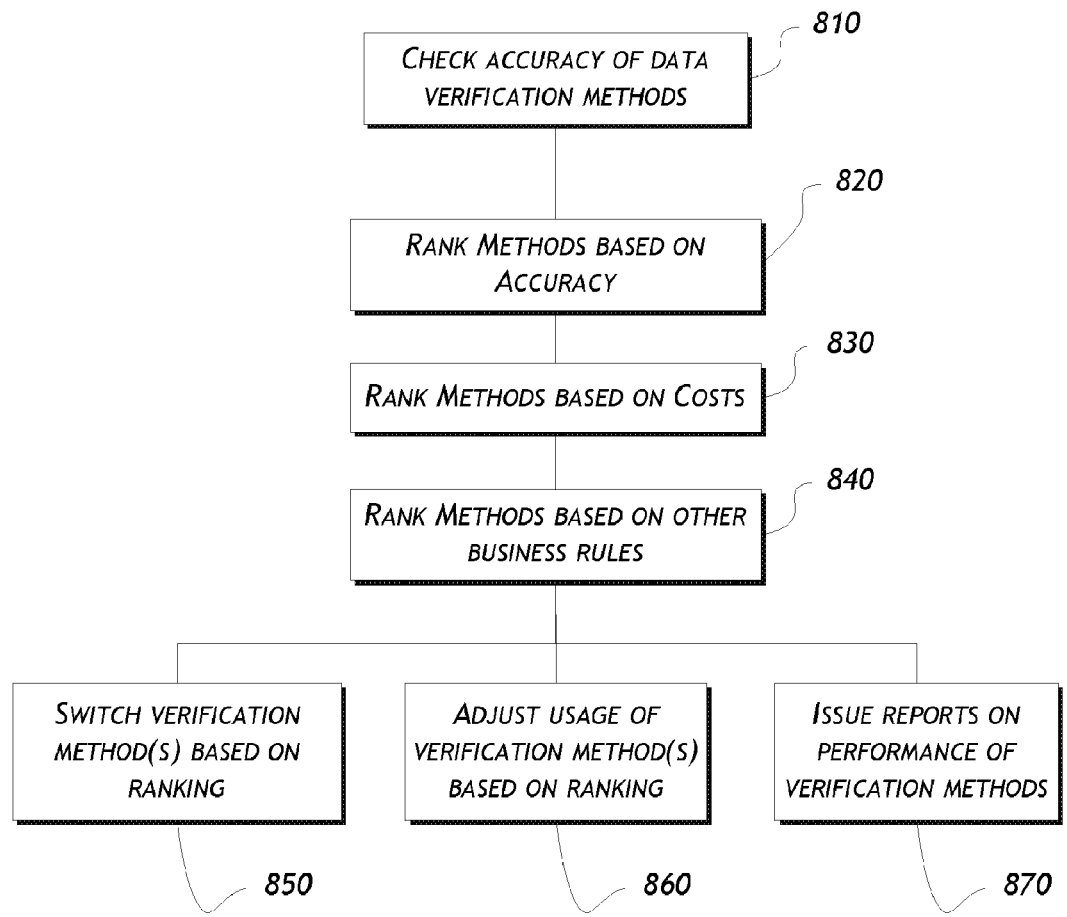
FIG. 8 is a flow diagram showing an example method of ranking data verification methods according to one embodiment.

With reference to FIG. 8, the quality control module 312 may check the accuracy of data verification methods at block 810. In certain embodiments, the quality control involves taking a sample of data records previous verified by a data verification method and compare them to the results of another data verification method. At block 820, the quality control module 312 is configured to dynamically rank, continuously or periodically, the foregoing data verification methods relative to their accuracy.

At block 830, the quality control module 312 is configured to dynamically compare and/or rank, continuously or periodically, the relative expense of using the foregoing verification methods. Optionally, at block 840, the quality control module 312 is configured to dynamically compare and/or rank, continuously or periodically, the foregoing verification methods based on other business rules.

At block 850, in certain embodiments, the quality control module 312 is configured to switch dynamically between the foregoing data verification methods. At block 860, in certain embodiments, the quality control module 312 is configured to increase the use of highly ranked data verification methods over lower ranked data verification methods based on accuracy, expense, or other ranking criteria (for example, regulatory compliance, timing, and so forth). In certain embodiments, at block 870, the data verification system provides reports, written or graphical or otherwise, for comparing the verification methods. The data verification system may provide reports that include without limitation, for example, dashboards, scorecards, or the like.

In certain embodiments, the data verification system is configured to signal to an operator or system administrator or project manager or the like when a certain data verification methodology falls below a certain accuracy level. In certain embodiments, the data verification system is configured to cause or start an investigation when the data verification system detects that a certain data verification methodology has fallen below a certain accuracy threshold.

Various Embodiments of System and Method Implementations

In certain embodiments, the systems and methods for verifying and updating data may be embodied in part or in whole in software that is running on a computing device. The functionality provided for in the components and modules of the computing device may comprise one or more components and/or modules. For example, the computing device may comprise multiple central processing units (CPUs) and a mass storage device, such as may be implemented in an array of servers.

In general, the word "module," "application", or "engine," as used herein, refers to logic embodied in hardware and/or firmware, and/or to a collection of software instructions, possibly having entry and exit points, written in a programming language, such as, for example, Java, C, and/or C++. These may be compiled and linked into an executable program, installed in a dynamic link library, or may be written in an interpreted programming language such as, for example, BASIC, Perl, or Python. It will be appreciated that modules, applications, and engines may be callable from others and/or from themselves, and/or may be invoked in response to detected events or interrupts. Instructions may be embedded in firmware, such as an EPROM.

It will be further appreciated that hardware may be comprised of connected logic units, such as gates and flip-flops, and/or may be comprised of programmable units, such as programmable gate arrays or processors. The modules, applications, and engines described herein are in certain applications preferably implemented as software modules, but may be represented in hardware or firmware in other implementations. Generally, the modules, applications, and engines described herein refer to logical modules that may be combined with other modules and/or divided into sub-modules despite their physical organization or storage.

In some embodiments, the computing device(s) communicates with one or more databases that store information on individuals, households, and businesses, including credit data and/or non-credit data. This database or databases may be implemented using a relational database, such as SQLite, Sybase, Oracle, CodeBase, mySQL, and Microsoft® SQL Server as well as other types of databases such as, for example, a flat file database, an entity-relationship database, and object-oriented database, and/or a record-based database.

In certain embodiments, the computing device is IBM, Macintosh, and/or Linux/Unix compatible. In another embodiment, the computing device comprises a server, a laptop computer, a cell phone, a Blackberry, a personal digital assistant, a kiosk, or an audio player, for example. In certain embodiments, the computing device includes one or more CPUs, which may each include microprocessors. The computing device may further include one or more memory devices, such as random access memory (RAM) for temporary storage of information and read only memory (ROM) for permanent storage of information, and one or more mass storage devices, such as hard drives, diskettes, or optical media storage devices. In certain embodiments, the modules of the computing are in communication via a standards based bus system, such as bus systems using Peripheral Component Interconnect (PCI), Microchannel, SCSI, Industrial Standard Architecture (ISA) and Extended ISA (EISA) architectures, for example. In certain embodiments, components of the computing device communicate via a network, such as a local area network that may be secured.

The computing is generally controlled and coordinated by operating system software, such as the Windows 95, Windows 98, Windows NT, Windows 2000, Windows XP, Windows Vista, Linux, SunOS, Solaris, PalmOS, Blackberry OS, or other compatible operating systems. In Macintosh systems, the operating system may be any available operating system, such as MAC OS X. In other embodiments, the computing device may be controlled by a proprietary operating system. Conventional operating systems control and schedule computer processes for execution, perform memory management, provide file system, networking, and I/O services, and provide a user interface, such as a graphical user interface (GUI), among other things.

The computing device may include one or more commonly available input/output (I/O) devices and interfaces, such as a keyboard, mouse, touchpad, microphone, and printer. Thus, in certain embodiments the computing device may be controlled using the keyboard and mouse input devices, while in another embodiment the user may provide voice commands to the computing device via a microphone. In certain embodiments, the I/O devices and interfaces include one or more display device, such as a monitor, that allows the visual presentation of data to a user. More particularly, a display device provides for the presentation of GUIs, application software data, and multimedia presentations, for example. The computing device may also include one or more multimedia devices, such as speakers, video cards, graphics accelerators, and microphones, for example.

In certain embodiments, the I/O devices and interfaces provide a communication interface to various external devices. For example, the computing device may be configured to communicate with one or more networks, such as any combination of one or more LANs, WANs, or the Internet, for example, via a wired, wireless, or combination of wired and wireless, communication links. The network communicates with various computing devices and/or other electronic devices via wired or wireless communication links.

Although the foregoing disclosure has been described in terms of certain embodiments, other embodiments will be apparent to those of ordinary skill in the art from the disclosure herein. Moreover, the described embodiments have been presented by way of example only, and are not intended to limit the scope of the disclosure. Indeed, the novel methods and systems described herein may be embodied in a variety of other forms without departing from the spirit thereof. Accordingly, other combinations, omissions, substitutions and modifications will be apparent to the skilled artisan in view of the disclosure herein. For purposes of discussing the invention, certain aspects, advantages and novel features of the invention have been described herein. Of course, it is to be understood that not necessarily all such aspects, advantages or features will be embodied in any particular embodiment of the disclosure.

What is claimed is:

1. An automated system for verifying data, the system comprising:
    an electronic data store that stores at least one data element associated with each of a plurality of individuals; and
    a computing device in communication with the electronic data store and that is configured to:
        retrieve from the electronic data store a plurality of data elements associated with an individual;
        select one or more of the plurality of data elements associated with the individual to be verified;
        electronically locate data similar to the selected one or more data elements associated with the individual on one or more network-accessible computing systems, wherein electronically locating the data similar to the selected one or more data elements comprises searching a plurality of websites for data associated with the individual;
        compare the selected one or more data elements to the similar located data; and
        based at least in part on the comparison, store one or more updated or appended data elements associated with the individual in the electronic data store, wherein the one or more data elements are updated or appended based at least in part on the located data.

2. The system of claim 1, wherein comparing the selected one or more data elements to the similar located data comprises determining data quality of both the selected data and the located data.

3. The system of claim 2, wherein the data quality is determined based at least in part on at least one of data completeness or data accuracy.

4. A computer-implemented method comprising:
    as implemented by one or more computing devices configured with specific executable instructions, retrieving from an electronic data store a plurality of data elements associated with an individual;

selecting one or more of the plurality of data elements associated with the individual to be verified;

electronically locating data similar to the selected one or more data elements associated with the individual on one or more network-accessible computing systems, wherein electronically locating the data similar to the selected one or more data elements comprises searching a plurality of websites for data associated with the individual;

comparing the selected one or more data elements to the similar located data; and based at least in part on the comparison, storing one or more updated or appended data elements associated with the individual in the electronic data store, wherein the one or more data elements are updated or appended based at least in part on the located data.

5. The computer-implemented method of claim 4, wherein comparing the selected one or more data elements to the similar located data comprises determining data quality of both the selected data and the located data.

6. The computer-implemented method of claim 5, wherein the data quality is determined based at least in part on at least one of data completeness or data accuracy.

7. A computer-readable, non-transitory storage medium storing computer executable instructions that, when executed by one or more computer systems, configure the one or more computer systems to perform operations comprising:

retrieving from an electronic data store a plurality of data elements associated with an individual;

selecting one or more of the plurality of data elements associated with the individual to be verified;

electronically locating data similar to the selected one or more data elements associated with the individual on one or more network-accessible computing systems, wherein electronically locating the data similar to the selected one or more data elements comprises searching a plurality of websites for data associated with the individual;

comparing the selected one or more data elements to the similar located data; and based at least in part on the comparison, storing one or more updated or appended data elements associated with the individual in the electronic data store, wherein the one or more data elements are updated or appended based at least in part on the located data.

8. The computer-readable, non-transitory storage medium of claim 7, wherein comparing the selected one or more data elements to the similar located data comprises determining data quality of both the selected data and the located data.

9. The computer-readable, non-transitory storage medium of claim 8, wherein the data quality is determined based at least in part on at least one of data completeness or data accuracy.

\* \* \* \* \*